US010740770B2

(12) United States Patent
Labrie et al.

(10) Patent No.: US 10,740,770 B2
(45) Date of Patent: Aug. 11, 2020

(54) METHOD AND SYSTEM FOR PROPERTY DAMAGE ANALYSIS

(71) Applicant: ACCURENCE, INC., Louisville, CO (US)

(72) Inventors: Zachary Labrie, Broomfield, CO (US); Benjamin Zamora, Arvada, CO (US); Timothy Bruffey, Commerce City, CO (US)

(73) Assignee: ACCURENCE, INC., Louisville, CO (US)

( * ) Notice: Subject to any disclaimer, the term of this patent is extended or adjusted under 35 U.S.C. 154(b) by 452 days.

(21) Appl. No.: 15/663,518

(22) Filed: Jul. 28, 2017

(65) Prior Publication Data

US 2017/0330207 A1 Nov. 16, 2017

Related U.S. Application Data

(63) Continuation of application No. 14/540,886, filed on Nov. 13, 2014, now Pat. No. 9,721,264, which is a
(Continued)

(51) Int. Cl.
*G06Q 30/02* (2012.01)
*G06Q 10/06* (2012.01)
(Continued)

(52) U.S. Cl.
CPC ......... *G06Q 30/0201* (2013.01); *G06F 30/13* (2020.01); *G06Q 10/06* (2013.01); *G06Q 10/063* (2013.01); *G06Q 40/08* (2013.01)

(58) Field of Classification Search
CPC .. G06F 17/5004; G06Q 10/06; G06Q 10/063; G06Q 30/0201; G06Q 40/08
See application file for complete search history.

(56) References Cited

U.S. PATENT DOCUMENTS

| 5,189,606 | A | 2/1993 | Burns et al. |
|---|---|---|---|
| 6,037,945 | A | 3/2000 | Loveland |

(Continued)

OTHER PUBLICATIONS

Notice of Allowance for U.S. Appl. No. 15/445,509, dated Nov. 5, 2018 10 pages.
(Continued)

*Primary Examiner* — Aniss Chad
(74) *Attorney, Agent, or Firm* — Sheridan Ross P.C.

(57) ABSTRACT

A system and method for combining CAD, inspection, and building guideline data for analyzing repair decisions and selecting waste containers is described. One embodiment includes receiving digital building facet data for a first building facet of a set of one or more building facets; receiving digital inspection data for the first building facet; determining an amount of building material required to repair damage to an area of the first building facet, including determining a first amount of waste building material; determining a repair indicator for the first building facet, the determining a repair indicator based at least in part upon the digital facet data for the first building facet and the inspection data for the first building facet; determining an appropriate waste container based upon the first amount of waste material; and displaying an electronic image of the set of one or more building facets.

20 Claims, 35 Drawing Sheets

Related U.S. Application Data continuation-in-part of application No. 13/542,541, filed on Jul. 5, 2012, now Pat. No. 9,158,869, which is a continuation-in-part of application No. 13/336,559, filed on Dec. 23, 2011, now Pat. No. 8,983,806.

(60) Provisional application No. 61/460,964, filed on Jan. 11, 2011.

(51) Int. Cl.
*G06Q 40/08* (2012.01)
*G06F 30/13* (2020.01)

(56) References Cited

U.S. PATENT DOCUMENTS

| | | | |
|---|---|---|---|
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 6,859,768 | B1 | 2/2005 | Wakelam et al. |
| 7,333,944 | B1 | 2/2008 | Harris |
| 7,389,255 | B2 | 6/2008 | Formisano |
| 7,747,460 | B2 | 6/2010 | Vandrilla |
| 7,844,503 | B2 | 11/2010 | Fogelson |
| 8,078,436 | B2 | 12/2011 | Pershing et al. |
| 8,145,578 | B2 | 3/2012 | Pershing et al. |
| 8,170,840 | B2 | 5/2012 | Pershing |
| 8,209,152 | B2 | 6/2012 | Pershing |
| 8,249,999 | B2 | 8/2012 | Dakar et al. |
| 8,401,222 | B2 | 3/2013 | Thornberry et al. |
| 8,670,961 | B2 | 3/2014 | Pershing et al. |
| 8,756,085 | B1 * | 6/2014 | Plummer ............... G06Q 40/00 705/4 |
| 8,983,806 | B2 | 3/2015 | Labrie et al. |
| 9,158,869 | B2 | 10/2015 | Labrie et al. |
| 9,609,288 | B1 | 3/2017 | Richman et al. |
| 9,721,264 | B2 | 8/2017 | Labrie et al. |
| 2002/0087332 | A1 | 7/2002 | Como |
| 2009/0216552 | A1 | 8/2009 | Watrous |
| 2009/0265193 | A1 * | 10/2009 | Collins ............... G06Q 30/0185 705/4 |
| 2010/0235206 | A1 | 9/2010 | Miller et al. |
| 2010/0332355 | A1 | 12/2010 | Lopez et al. |
| 2015/0170288 | A1 | 6/2015 | Harlon et al. |
| 2015/0348204 | A1 | 12/2015 | Daues |
| 2016/0098802 | A1 | 4/2016 | Bruffey et al. |
| 2016/0307447 | A1 | 10/2016 | Johnson et al. |
| 2017/0132711 | A1 | 5/2017 | Bruffey et al. |
| 2017/0169459 | A1 | 6/2017 | Bruffey et al. |
| 2017/0249510 | A1 | 8/2017 | Labrie et al. |
| 2017/0345069 | A1 | 11/2017 | Labrie et al. |

OTHER PUBLICATIONS

U.S. Appl. No. 15/970,484, filed May 3, 2018, Labrie et al.
Official Action for U.S. Appl. No. 13/336,559, dated Apr. 15, 2014, 9 pages.
Notice of Allowance for U.S. Appl. No. 13/336,559, dated Dec. 5, 2014, 8 pages.
Official Action for U.S. Appl. No. 13/542,541, dated May 23, 2014, 10 pages.
Final Action for U.S. Appl. No. 13/542,541, dated Jan. 28, 2015, 11 pages.
Notice of Allowance for U.S. Appl. No. 13/542,541, dated Aug. 5, 2015, 8 pages.
Notice of Allowance for U.S. Appl. No. 14/540,886, dated Mar. 28, 2017, 10 pages.
Official Action for U.S. Appl. No. 14/968,574, dated Jan. 3, 2017, 28 pages.
Final Action for U.S. Appl. No. 14/968,574, dated Aug. 28, 2017, 34 pages.
Official Action for U.S. Appl. No. 14/968,574, dated May 1, 2018, 39 pages.
Official Action for U.S. Appl. No. 15/445,509, dated May 10, 2018, 14 pages.
U.S. Appl. No. 16/208,113, filed Dec. 3, 2018, Labrie et al.
U.S. Appl. No. 16/245,506, filed Jan. 11, 2019, Labrie et al.
"ImproveNet's Two-Stage Pricing Wizard Makes It Easy to Calculate Roofing Costs; Dual Views Offer Tradeoffs Between Speed, Precision," Business Wire, 2000, 6 pages.
Final Action for U.S. Appl. No. 14/968,574, dated Feb. 8, 2019, 42 pages.
Official Action for U.S. Appl. No. 15/214,877, dated Mar. 22, 2019, 8 pages.
U.S. Appl. No. 13/336,559, filed Dec. 23, 2011 now U.S. Pat. No. 8,983,806.
U.S. Appl. No. 13/542,541, filed Jul. 5, 2012 now U.S Pat. No. 9,158,869.
U.S. Appl. No. 14/540,886, filed Nov. 13, 2014 now U.S. Pat. No. 9,721,264.
U.S. Appl. No. 15/345,071, filed Nov. 7, 2016 now U.S. Patent No.
U.S. Appl. No. 14/968,574, filed Dec. 14, 2015 now U.S. Patent No.
U.S. Appl. No. 15/214,877, filed Jul. 20, 2016 now U.S. Patent No.
U.S. Appl. No. 15/445,509, filed Feb. 28, 2017 now U.S. Patent No.
U.S. Appl. No. 15/606,475, filed May 26, 2017 now U.S. Patent No.
U.S. Appl. No. 15/970,484, filed May 3, 2018 now U.S. Patent No.

* cited by examiner

Name: Medium Roofing Company 2

Applies Dumpsters Auto: ☐

Allow Dumpster Application In UI: ☑

Default Dumpster Application In UI: ☑

Dumpster Code: Default

Use Contractors Dumpsters: ☐

SCOPE ITEMS

The scope items have been generated by SettleAssist based on inspection information provided by the Claim Representative, roof CAD measurements (when available), and business rules of the insurance carrier. Please make any necessary changes in Xactimate.

ROOF

| Item | Qty | Unit | Dep. by | Age | Dep. % | ACV |
|---|---|---|---|---|---|---|
| All | | | | | | |
| Remove - Laminated - comp. shingle rfg. - w/ felt | 54.51 | SQ | Percent | | 0.00 | ☐ |
| Remove - Additional charge for steep roof - 7/12 to 9/12 slope | 23.97 | SQ | Percent | | 0.00 | ☐ |
| Remove - Additional charge for steep roof - 10/12 - 12/12 slope | 25.74 | SQ | Percent | | 0.00 | ☐ |
| Remove - Additional charge for high roof (2 stories or greater) | 27.3 | SQ | Percent | | 0.00 | ☐ |
| Replace - Roofing felt - 15 lb. | 54.51 | SQ | Percent | | 0.00 | ☐ |
| Replace - Drip edge | 410.87 | LF | Percent | | 0.00 | ☐ |
| Replace - Laminated - comp. shingle rfg. - w/out felt | 62.69 | SQ | Percent | | 0.00 | ☐ |
| Replace - Additional charge for steep roof - 7/12 to 9/12 slope | 23.97 | SQ | Percent | | 0.00 | ☐ |
| Replace - Additional charge for steep roof - 10/12 - 12/12 slope | 25.74 | SQ | Percent | | 0.00 | ☐ |
| Replace - Additional charge for high roof (2 stories or greater) | 27.3 | SQ | Percent | | 0.00 | ☐ |
| Replace - Flashing - rain diverter | 2 | EA | Percent | | 0.00 | ☐ |
| Replace - Flashing - pipe jack | 6 | EA | Percent | | 0.00 | ☐ |
| Replace - Roof vent - turtle type - Metal | 2 | EA | Percent | | 0.00 | ☐ |
| Replace - Exhaust cap - through roof - 6" to 8" | 5 | EA | Percent | | 0.00 | ☐ |
| Detach and Reset - Roof mount power attic vent | 2 | EA | Percent | | 0.00 | ☐ |
| Remove and Replace - Power attic vent cover only - metal | 2 | EA | Percent | | 0.00 | ☐ |
| Detach and Reset - Digital satellite system - Detach & reset | 1 | EA | Percent | | 0.00 | ☐ |

ELEVATION

| Item | Qty | Unit | Dep. by | Age | Dep. % | ACV |
|---|---|---|---|---|---|---|
| All | | | | | | |
| Remove and Replace - Gutter / downspout - aluminum - up to 5" | 38 | LF | Percent | | 0.00 | ☐ |
| Remove and Replace - Gutter / downspout - aluminum - up to 5" | 42 | LF | Percent | | 0.00 | ☐ |
| Remove and Replace - Window screen, 10 - 16 SF | 1 | EA | Percent | | 0.00 | ☐ |

SYSTEM ESTIMATED DISPOSAL

| Item | Qty | Unit | Dep. by | Age | Dep. % | ACV |
|---|---|---|---|---|---|---|
| ALL | | | | | | |
| Replace - Haul debris - per pickup truck load - including dump fees | 0.5 | EA | Percent | | 0.00 | ☐ |

FIGURE 30

ESTIMATED DEBRIS REMOVAL

Xactimate includes the cost of debris removal in the price of some roof items. Debris removal adjusted for Xactimate:

Adjusted Weight: 25 lbs.
Adjusted Volume: 0.58 cubic yards
Debris Removal Added to Estimate:

Half Pickup Truck Load

Debris removal for all items being removed:

Weight: 15248 lbs.
Volume: 28.38 cubic yards
Non-Adjusted Debris Removal:

40 Yard Dumpster

\* Dumpster sizes and truck loads for debris removal may have been determined by weight or volume. Weight and volume for debris removal are estimates. Adjust debris removal in the estimating system as needed.

FIGURE 31

METHOD AND SYSTEM FOR PROPERTY DAMAGE ANALYSIS

CROSS-REFERENCE TO RELATED APPLICATIONS

The present application is a continuation of U.S. patent application Ser. No. 14/540,886, filed Nov. 13, 2014, now U.S. Pat. No. 9,721,264, which is a continuation-in-part of U.S. patent application Ser. No. 13/542,541, filed Jul. 5, 2012, now U.S. Pat. No. 9,158,869, which is a continuation-in-part of U.S. patent application Ser. No. 13/336,559, filed Dec. 23, 2011 now U.S. Pat. No. 8,983,806, which claims the benefit of U.S. Provisional Patent Application Ser. No. 61/460,964, filed Jan. 11, 2011, each of which is incorporated herein by reference in its entirety for all purposes.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to methods and systems for building facet analysis and applying property repair guidelines to that analysis. In particular, but not by way of limitation, the present invention relates to systems and methods for intelligently creating a set of guidelines and applying it to a building repair analysis to ensure building codes and other construction requirements and building repair waste requirements are met. Additionally, it relates to systems and methods for using aerial CAD data, insurance and building code guidelines, weather data, and inspection data for intelligently making repair decisions for building facets.

BACKGROUND OF THE INVENTION

In the homeowner's insurance industry, carriers face costly exposure to inaccurate payments, lawsuits, reduced business, and lost shareholder value due, in part, to adjusters' inconsistent and inaccurate methods of inspection, data gathering, and reporting. Furthermore, carriers miss significant opportunities to collect statistical and quantitative analytics that provide effective cost controls and much needed intelligence.

Estimating software products, such as Xactware, MSB, Symbility, and the like, have roof sketching tools that enable users to draw a roof themselves. However, these tools have limited functionality. Aerial CAD companies, such as EagleView, Precigeo, Geoestimator, and the like, can provide information about roof facet line types and roof facet directionality. Using either of these current types of tools, a user must determine, based on the limited information available, which roof facets and roof facet lines to replace. Using the limited, and often inaccurate data, the user must also determine the roof facet area quantities and roof facet line quantities that to replace. Furthermore, users make decisions about whether to replace or repair each roof facet or line based on the limited and often inaccurate data. Some current tools make use of inspection data input by a user to assist in the analysis. However, again that data can be suspect because it is subject to the user's interpretation and the interpretation is based on a limited quantity and quality of data.

For example, storms that cause wind and hail damage to buildings are directional. Therefore roof facets on the same roof have varying degrees of damage. This makes a repair vs. replace analysis and estimating repairs for a building subjected to directional storm difficult. Consequently, errors occur in estimating repair and replacement costs, the amount of materials required, and the amount of resulting waste material. More important, errors occur in determining whether fixing a facet or line requires a repair or replacement or whether it requires fixing at all. Pricing tools also exist to assist in determining labor and material costs for repair or replacement. Again, however, those tools have limited functionality and operate on incomplete or potentially inaccurate data.

In using existing tools, a user must select which roof facets to include in the roofing material installation. The user uses the individually calculated roof facet area quantities or the summed roof facet area quantities and adds a waste amount to the quantities after the fact. The waste amount that users add is meant to pay for the partial shingles that cannot be used in the installation and sometimes the ridge caps and starter strips. The added waste amount often ranges anywhere from eight to twenty-five percent. The waste amount is either a predetermined amount set by a guideline, for example an insurance guideline, or a user's judgment call based on the roof's structure or the material required.

Moreover, multiple, conflicting requirements or guidelines may apply to the property, thus introducing further complexity in the repair analysis. Current building code rules are created by the International Code Council (ICC). Local municipalities choose which code books that they want to follow. The municipalities adjust and augment the ICC codes for their local area. In the United States alone, there are about 80,000 municipalities. Consequently, it is difficult for insurance companies and roofing contractors to determine which municipalities a home is within and what the building codes are for those municipalities. The same issues apply in other countries as well.

Many different types of building materials are used today and oftentimes are difficult to identify by insurance adjusters or contractors. For roofing material, sample shingles from the property must be sent offsite for analysis to determine the manufacturer and shingle type so that a proper repair or replacement can be completed. This analysis takes time and the full determination of cost must wait for the analysis to be complete.

Further, even before an adjuster or contractor is onsite to inspect or repair damage, a homeowner or property owner may have no idea if the property is damaged. And after damage-causing events, contractors often try to generate business by going door-to-door in potentially-damage-affected areas. Because a property owner likely does not know whether the property is damaged, the property owner will not know whether to trust the visiting contractor. Indeed, without having been able to inspect the property, even the contractor will not know whether the property is damaged.

Although present devices and systems are functional, they are not sufficiently accurate or otherwise satisfactory. Accordingly, a system and method are needed to address the shortfalls of present technology and to provide other new and innovative features. What is needed is a system and method for combining available data for providing accurate repair vs. replacement analysis and material and cost estimation. In particular, a system and method is needed to scientifically calculate, based on disparate data sources and particular installation procedure requirements as described above, the actual amount of building material required for installation. Further, a system or method is needed for intelligently deciding which building facets are in need of replacement or repair because current solutions based on disparate data sources such as inspection data, including weather data, insurance guidelines, and building codes. Additionally, a system or method is needed for accurately and quickly determining the amount and type of building material required for a repair or replacement, the amount of waste that will be generated, and the amount of waste that can be recycled.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide systems and methods for intelligently combining CAD, inspection, and building guideline data for intelligently setting roof facet directionality, analyzing repair and replacement decisions and estimating material, material waste, and repair or replacement costs and requirements for building facets.

Onsite, an adjuster typically will use a smart paper form and digital pen to capture inspection data. In an exemplary embodiment, the digital inspection data from the adjuster is uploaded to an analysis engine which can validate and analyze the data using predetermined business rules; enforce compliance with carrier guidelines and local rules; complete calculations; create a digital three-dimensional model of the property; prepare a scope of repair; and send information, for example, in an XML file, to an estimating vendor to automatically deliver a pre-qualified estimate to the adjuster. Because all of the necessary data and guidelines are integrated by the system and method, an estimate can be delivered approximately in real-time. For example, the estimate can be delivered within 90 seconds given a full set of predetermined rules and guidelines. In other embodiments, an estimate can be delivered approximately in real-time after user input to the analyses.

Exemplary systems and methods in accordance with the present invention can collect CAD data from aerial CAD providers and inspection data from the onsite user. Some examples of CAD data from aerial CAD providers included points, lines, line types, roof facet degrees, roof facet pitch, roof facet size, and the like. Some examples of inspection data include hail hit frequency, wind damaged data, building material, building material type, building material age, and the like.

Building material type can include the type of building material that comprises the building facet or building facet line, for example shingle, siding, decking, shield, drywall, insulation, and the like. Building material type can also include other information concerning a building facet or building facet line, for example, whether the building material type is exposed, partially exposed, exterior, interior, layered, and the like. Building material can include the material of which the facet components are built, for example wood shingle, asphalt shingle, clay root tiles, metal gutter, fiberglass gutter, gypsum drywall, vinyl siding, aluminum siding, wood siding, and the like. Embodiments can accommodate multiple building materials and building material types. Further, some embodiments can enable user input building material and building material types to further refine the repair indicator decisions.

Some embodiments can use both types of data, along with others such as regional, local, or other insurance guidelines and local or other building codes, to make a replacement or repair decision for each building facet. Further, exemplary systems and methods in accordance with the present invention can assign to each building facet a resulting replacement decision. Exemplary systems and method in accordance with the present invention can determine the amount of building material required for each building facet based on the size of the material, installation requirements, rules, and guidelines, and building facet characteristics. Some embodiments can adjust the area of building material installation to match the installation requirements, rules, and guidelines. In some embodiments, a building material pattern is created and a building facet is superimposed on it to identify the building materials needed for installation. Wholly- and partially-used building materials are identified, and partially-used roofing materials are reused on other building facets. Actual building material use and waste are calculated. Exemplary systems and methods in accordance with the present invention can be configured to handle variable aspects of roofing material installation including roofing material types, processes, rules, partial building materials, and building material waste.

Furthermore, because aerial CAD data and weather data can be used to analyze damage and repair requirements, some embodiments can determine the likelihood that a particular property or properties in a particular area are damaged. An exemplary system can apply data related to a damage-causing event to aerial CAD data of a property in the affected area to determine which facets of the properly may be damaged, the likelihood of damage to those facets, estimate damage costs, and the like. Moreover, an exemplary system can determine the number of adjusters that should be deployed to the area to contact property owners; contact property stakeholders, such as the property owner, the property owner's insurance agent, local authorities, and the like about the potential damage; and determine information about the materials, suppliers, material manufacturers, contractors, and the like required for the potential property repair. An exemplary system can perform the property repair analysis before any adjusters, contractors, inspectors, or others who assess damage or normally contact property owners regarding the potential damage In one exemplary embodiment, the present invention can include a method for property repair analysis, comprising: receiving digital building facet data for a first building facet of a set of one or more building facets; receiving digital inspection data for the first building facet; determining an amount of building material required to repair damage to an area of the first building facet, including determining a first amount of waste building material; determining a repair indicator for the first building facet, the determining a repair indicator based at least in part upon the digital facet data for the first building facet and the inspection data for the first building facet; determining an appropriate waste container based upon the first amount of waste material; and displaying an electronic image of the set of one or more building facets.

The method may be implemented on a computer equipped with memory, processor, user-interface peripheral devices including a display, storage media devices, and network communications interfaces. The invention also provides a tangible digital storage medium embodying machine-readable instructions executable by a computer, where the instructions implement the method.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIGS. 26-31 show exemplary user interfaces for displaying waste container characteristics or settings in accordance with illustrative embodiments of the invention.

DETAILED DESCRIPTION

Figures 1A, 1B:
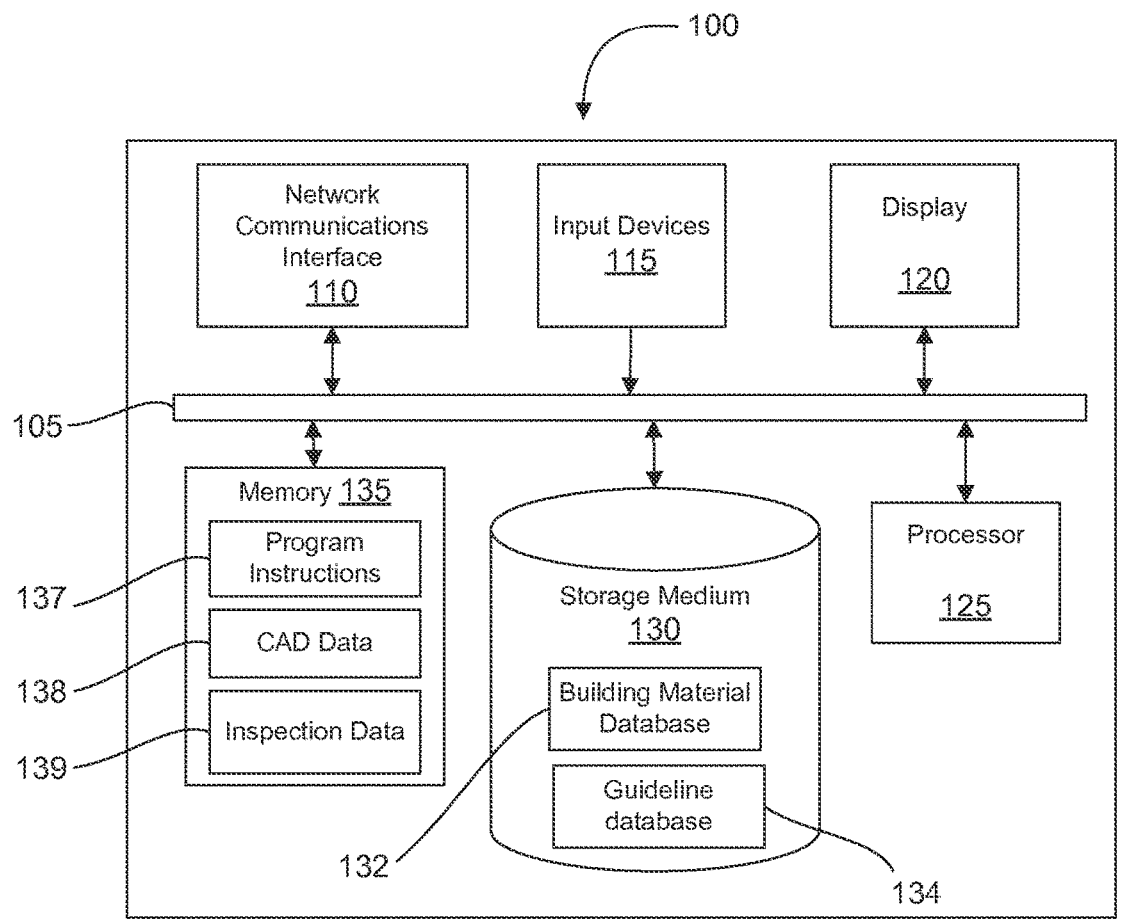
FIG. 1A shows a functional block diagram of a computer equipped with a building facet analysis application in accordance with an illustrative embodiment of the invention.
FIG. 1B shows a schematic of a network system implementing a building facet analysis application in accordance with an illustrative embodiment of the invention.

Referring now to the drawings, where like or similar elements are designated with identical reference numerals throughout the several views, and referring in particular to FIG. 1A, it illustrates a functional block diagram of a computer 100 in accordance with an illustrative embodiment of the invention. In FIG. 1A, processor 125 communicates over data bus 105 with input devices 115, display 120, network communications interface 110, storage medium 130, and memory 135. Though FIG. 1A shows only a single processor, multiple processors or a multi-core processor may be present in some embodiments. Input devices 115 include, for example, a keyboard, a mouse or other pointing device, or other devices that are used to input data or commands to computer system 100 to control its operation. Network communications interfaces 110 may include, for example various serial or parallel interfaces for communicating with a network or one or more peripherals.

Memory 135 may include, without limitation, random access memory (RAM), read-only memory (ROM), flash memory, magnetic storage (e.g., hard disk drive), optical storage, or a combination of these, depending on the particular embodiment. In FIG. 1A, memory 135 includes program instructions 137, which process CAD data 138 and inspection data 139. Database 130 includes building materials database 132 and guideline database 134 for the storage of building materials information and guidelines to apply during the property repair analysis. It should be understood that the organization of storage shown in FIG. 1A is the illustration of one embodiment and that other organization schemes or storage mechanisms or schemes can be utilized.

In one illustrative embodiment, program instructions 137 are implemented as software that is executed by processor 125. Such software may be stored, prior to its being loaded into RAM for execution by processor 125, on any suitable computer-readable storage medium such as a hard disk drive, an optical disk, or a flash memory (see, e.g., storage medium 130). In general, the functionality of program instructions 137 may be implemented as software, firmware, hardware, or any combination or sub-combination thereof.

In the illustrative embodiment shown in FIG. 1A, network communications interface 110 can be used to receive CAD data 138 and inspection data 139. For example, CAD data 138 can be received from a provider of aerial CAD data. Similarly, network communications interface 110 can receive inspection data 139.

Referring now to FIG. 1B, it illustrates a system 150 in accordance with an exemplary embodiment of the invention. In FIG. 1B computer 195, which can be similar or identical to computer 100, communicates with a server 190 which receives digital building facet data from an aerial CAD provider database 160 and repair guideline data from a guideline database 165. Such repair guideline data can be provided by, for example, insurance carriers. Digital building facet data can be received from some other source that provides dimensional building facet data, directional building facet data, and other building facet data. In some embodiments, additional data sources can provide building facet data, guideline data, or both. Further, databases 160 and 165 and other data sources can be combined or further separated data sources from which data is received. Inspection data can be received via a communications network 175 from onsite inspection data captured by portable inspection device 170. Other data received by computer 195 can include building code requirements. Portable inspection device 170 can be a PDA, smartphone, laptop, or other hardware configured to capture inspection data for transmission to server 190 and computer 195. For example, portable inspection device 170 can include specialized hardware and/or software for capturing inspection data. In other embodiments, portable inspection device 170 can be replaced by some other computing device used by an insurance adjuster or other person to enter or capture inspection data. For example, an insurance adjuster may manually capture inspection data by manually taking notes or filling out a form in hardcopy and then later transferring that data, either manually (e.g., data entry) or automatically (e.g., scanning, data transfer), to another computing device. In some embodiments, server 190 can be configured to receive inspection data from portable inspection device 170.

In some embodiments, computer 195 can be a portable computer or device. For example, portable inspection device 170 can implement the functions and structure of computer 195 necessary to embody a portion of an embodiment of the invention, including receiving data, for example from databases 160 and 165. Such a device can be useful so that estimations can be produced onsite at the inspection. Those of skill in the art can appreciate that computer 195 can be implemented as a laptop, tablet computer, PDA, smart phone, or other portable device or a personal computer, minicomputer, mainframe computer, or other non-portable device. Furthermore, some embodiments can include a computer 195 that receives data directly rather than through a server 190 or some other device. Likewise, in one embodiment, portable inspection device 170 can communicate directly to computer 195.

Figure 2:
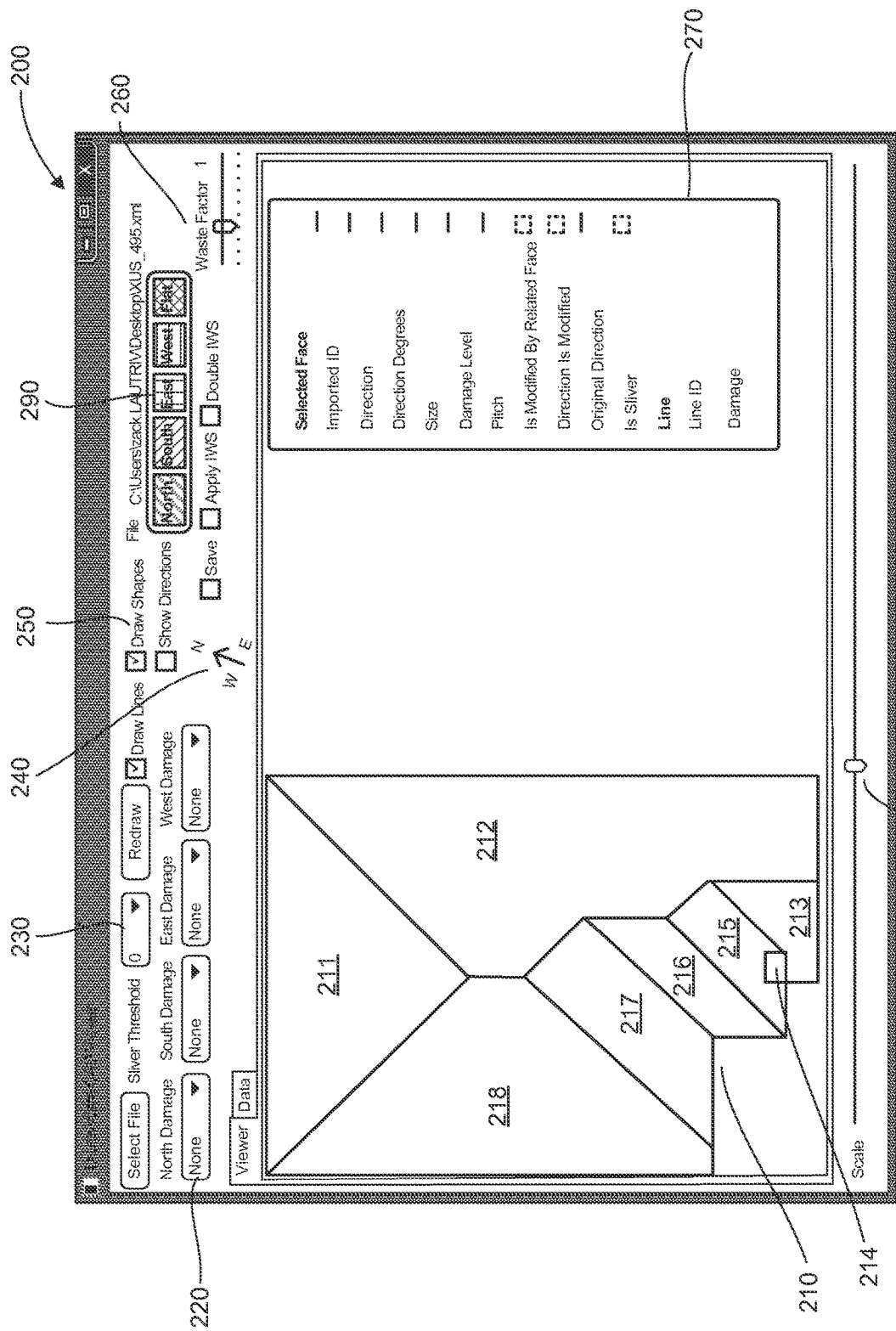
FIGS. 2-3 and 5-8 show exemplary versions of a computer-based application in accordance with embodiments of the invention.

Referring now to FIG. 2, it illustrates a portion of a system in accordance with an embodiment of the present invention. Shown is a computer-aided design (CAD) application 200 that can implement a portion of the system. The application 200 can be implemented on a computer system. The application 200 can display electronic CAD images or some other type of digitally rendered electronic images of building facets, in part, to enable repair decision or settings to be graphically depicted. It should be understood that images described herein and the data used to compile them can include CAD images and data or electronic images or digital data suitable for other digital rendering. In some embodiments, the CAD image 210 is constructed from aerial CAD data. Such aerial CAD data can be received from a CAD provider. The exemplary embodiment of FIG. 2 shows a roof CAD image 210 and its facets 211-218 of a particular building. The facet CAD image 210 can be projected into three-dimensional space.

Other embodiments may display CAD images in two-dimensional space. For example, each facet of the image can be displayed horizontally so that the view direction to each facet is normal to the plane of each facet. Further, facets other than the roof facets of CAD image 210 can be shown. For example, facets can include vertically- or horizontally-aligned facets or facets aligned at an angle. All of the facets of roof CAD image 210 shown in FIG. 2, for example, are angled except for facet portion 214. Facet portion 214 is part of facet 213 and sits under facet 215. Building facets specifically can include walls, doors, windows, gables, ridges, eaves, gutters, posts, patios, decks, dormer facets, chimney facets, and other faces or sections of a building. The invention can operate on CAD images for various types of buildings including, but not limited to, houses, sheds, garages, apartment buildings, condominiums, attached houses, and other residential type buildings. Further buildings can include office buildings, school buildings, agricultural buildings, industrial buildings, parking structures, religious buildings, shopping centers and malls, and other non-residential buildings. Those of skill in the art can appreciate that the present invention can be used to assess damage and determine repair requirements for any structure.

Returning to FIG. 2, an embodiment of the present invention can link building facets together using shared lines and shared points. Linking can be accomplished, for example as shown in FIG. 2, by displaying facets such that each facet is adjacent to each physically adjacent facet. In another embodiment linking can include displaying facets blown up (i.e., with gaps in between facets). Such a display can make clear the shape and relative size of each facet. For example two adjacent facets may face substantially the same direction. Separating the image of each facet can make clearer the physical separateness of the facets. Furthermore, where building facets include a different material for each of different portions of a facet, the facet can be separated into two more facets for display. Other methods of visually depicting different facets or different portions of a facet can be used, including lines, pattern coding, shade coding, color coding, and the like.

In some embodiments, directionality can be assigned to building facets 211-218. Directionality can be assigned to each facet 211-218 based on a threshold angle difference from normal to a compass direction. For example, in one embodiment, where a facet angle differs from a compass direction by anything from less than 90° to −90° can be assigned the directionality of that compass direction. In other embodiments, the threshold can be lower. In such embodiments, directionalities in addition to north, south, east, and west can be included to accommodate the smaller thresholds. For example, north-west can be included where the threshold is anything from less the 45° to −45°. Other directionalities than those based on compass directions can be included. For example, directionality indicating that a facet is parallel to the ground surface or some other substantially horizontal surface can be included.

Figure 3:
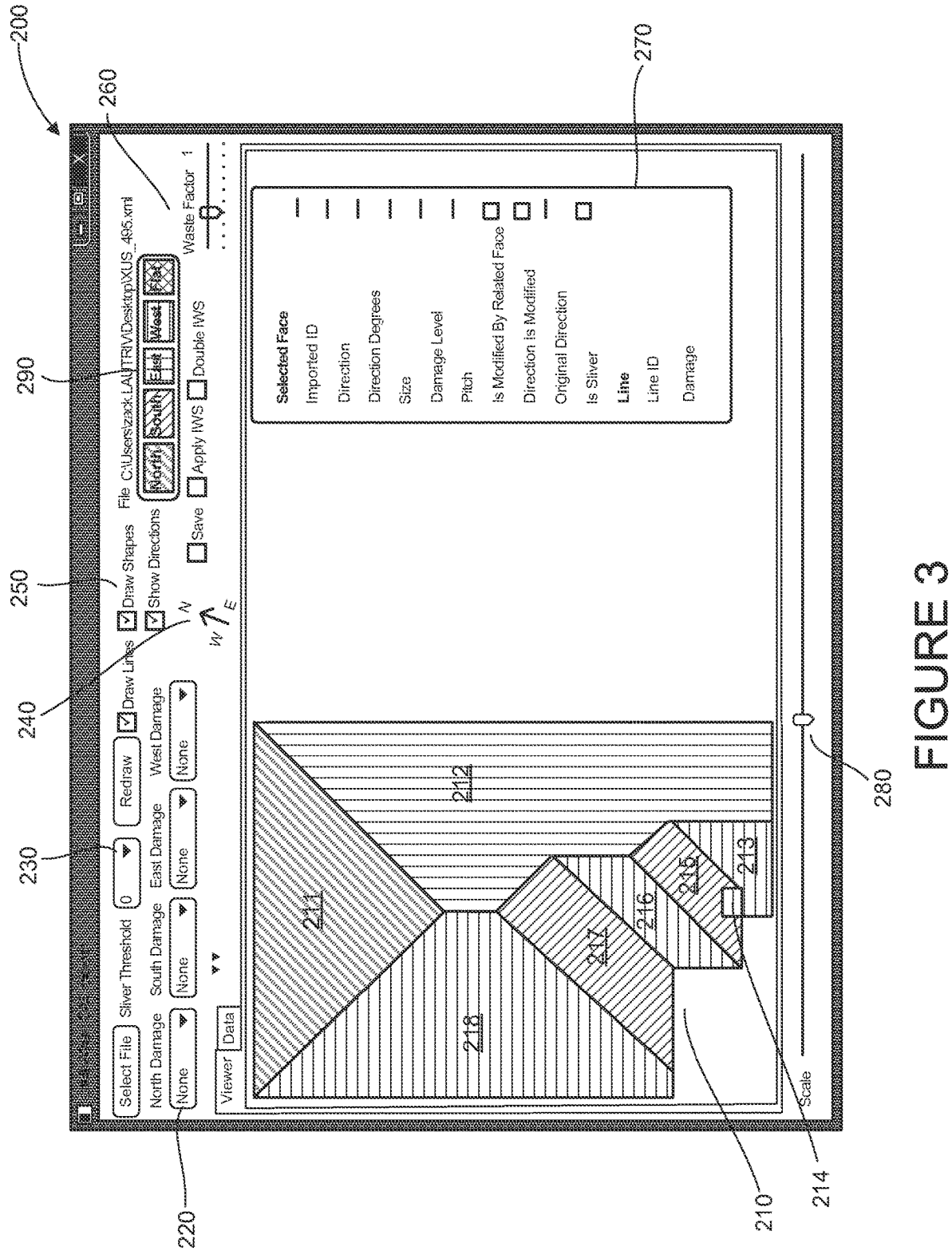

Referring now to FIG. 3, building facet CAD image 210 is coded to indicate the directionality of each roof facet 211-218. For example, each facet's directionality is illustrated using pattern coding. As can be seen, north-facing facet 211 has a forward-diagonal line pattern, east-facing facet 212 has a vertical line pattern, west-facing facets 213, including facet portion 214, 216, and 218 have a horizontal line pattern, south-facing facets 215 and 217 have a backward-diagonal line pattern, and any flat facets would have a cross-hatch pattern. In other embodiments coding of directionality can be accomplished by color-coding, number, letter, or word coding, shade coding, brightness coding, and the like.

In some embodiments, a system can include sliver detection. For example, in the exemplary systems illustrated in FIGS. 2 and 3 include a sliver threshold option 230. Using a sliver threshold, sliver detection can be performed in which a building facet size threshold for assigning additional directionality to a building facet can be set. A predetermined sliver threshold can be set or a sliver threshold can be set to particular values. In some embodiments, a primary building facet and each of that primary building facet's linked building facets, or secondary building facets, can be determined. If a secondary building facet has a direction assigned to it that is different than the direction assigned to the primary roof facet, the primary building facets directionality can be assigned to a secondary building facet. For example, in CAD image 410 of FIG. 4A, building facets 214, including facet portion 213, 216, and 218 of building CAD image 410 are all assigned the same directionality. In building CAD image 420 of FIG. 4B, building facet 215 may fall below a sliver threshold and because building facet 215 is linked to building facet 216 and building facet 216 has the same directionality as building facet 218, building facet 215 is assigned the same directionality. Furthermore, the area of building facet 217 does not fall below the sliver threshold. Consequently, even though building facet 217 is linked to building facet 218, its directionality is not re-assigned. The directionality assignment can depend on the size or area of the secondary building facet. In other embodiments, the assignment can depend on the relative size of the primary and secondary building facets, the shape of the primary or secondary building facet, and the relative offset from normal to the assigned directionality of either or both of the primary and secondary building facets. Those of skill in the art can appreciate the different types of relationships between the primary building facet and a secondary building facet that can be used to determine whether directionality should be assigned to a secondary building facet.

In some embodiments, directionality can be changed or reassigned to a building facet. For example, the directionality of a building facet can be set by a user. In other embodiments, the directionality of a building facet can be reassigned automatically according to some criteria other than a sliver threshold. For example, where a building facet is adjacent to other building facets on a predetermined number of sides or a predetermined length of the building facet's outline, the building facet's directionality can be reassigned to the directionality of the adjacent building facets.

Returning to FIG. 2, the CAD image of roof CAD image 210 and its facets 211-218 can be constructed from aerial CAD data. In some embodiments, CAD data is collected from aerial CAD providers. Some examples of CAD data include points, lines, line types, roof facet degrees, roof facet pitch, roof facet size, and the like.

Also shown in FIG. 2 is an information panel 270 to indicate information about a particular selected facet from facets 211-218. Information in information panel 270 can include, for example, information from the aerial CAD image for the selected facet, the direction the facet faces, the angle from normal relative to a direction, in degrees that the facet sits; a size of the facet, for example the area; the damage level, the pitch, or slope, of the facet; an indication of whether the building facet is modified in some way by a linked facet; whether the building facet's directionality has been reassigned; the building facet's original or actual directionality; the building facet's assigned directionality; the building facet's materials information, for example the building material or building material type; whether the building facet is considered a sliver, i.e., the building facet falls below a sliver threshold; whether the object is a line; identifier for the line; damage-related information; and repair indicator information, for example a code or text indicating the repair indicator for the building facet and whether the repair indicator is automatically set or set by a user.

Some embodiments can include a compass indicator 240 as part of the display. This can be useful to assist the user in understanding the offset angle of facets from their directionality. Embodiments can also include options 250 for displaying CAD features in the image. The exemplary embodiment of FIG. 2 includes "Draw Lines" "Draw Shapes," and "Show Directions." Others can include options for displaying the image in color or grayscale, displaying information panel 270 or other ancillary information, displaying a projected three-dimensional image or two-dimensional image, displaying linked or separated facets, and the like. Embodiments can include other, non-binary functions such as scale function 280. Other functions can include facet separation distance; facet line brightness, thickness, or other characteristic; facet brightness or some other characteristic based on damage severity or some other value. Those of skill in the art can appreciate the different options and functions available for display settings within a system that embodies the invention.

The embodiment shown in FIG. 2 includes facet direction repair indicators 220. In the exemplary embodiment of FIG. 2, facet direction repair indicators 220 includes settings for North, South, East, and West. Other embodiments can include settings for additional directions, for example, Flat, Northwest, Southeast, Northeast, Southwest, and the like. In yet other embodiments, facet repair indicators can be included for types of surfaces. For example, settings can include walls, windows, doors, or other types of facets. Further settings can include material or material type. In yet other embodiments combinations of the above can be used to indicate facet direction repair indicators 220. Repair indicators can include repair, replace, inspect, inspect further, or other action to be taken on the particular facet or facet type.

A repair indicator can be determined based on inspection data, weather data, building facet data, guideline data, and combinations thereof. For example, where a hail hit frequency is above a predetermined frequency, a building facet can be tagged with a "REPLACE" repair indicator rather than a "REPAIR" or some other repair indicator if the frequency is equal to or falls below the predetermined frequency. Likewise, if wind damage data indicates that wind speed rose above a predetermined threshold, for a predetermined amount of time, or a combination thereof, the repair indicator can be set to "REPLACE." Other weather data also can be used to determine the repair indicator. Weather data can be used in conjunction with directionality or other geometric building facet data (e.g., area, shape, etc.) and guideline data to further refine predetermined thresholds and set repair indicators.

Referring now to FIG. 3, portions of an exemplary system are shown. In some embodiments, decisions related to repairing, replacing, or taking other action can be made. Inspection data from an onsite roof inspector can be received. The inspection data can include data such as type of roofing material, hail hit frequency (e.g., number of hail hits), wind damage data (e.g., area of wind damage), and the like. Those of skill in the art can appreciate the different inspection-related data that can be used to enable a decision related to repairing, replacing, or taking some other action related to damage to a building facet. In some embodiments, inspection data can be applied to CAD data. Upon receiving inspection data, analysis related to whether to repair, replace, or take some other action can be performed for each directionality of the building facets. Each building facet can have other building facets linked to it that are identified for replacement, for repair, as not damaged, or by some other indicator depending on the analysis.

In some embodiments, CAD information, inspection data, or both can be used to make a repair, replacement, or other decisions for a building facet. Exemplary embodiments can use the directionality assigned to building facets and analysis decision for the directionality. A building facet can be tagged with a "REPAIR" repair indicator, "REPLACE" repair indicator, or some other repair indicator based on its assigned directionality, some other characteristic, or a combination of characteristics. If a building facet has more than one assigned directionality, more than one repair indicator, or both then a repair indicator with the highest priority can be used. For example, "REPLACE" may have priority over "REPAIR." Some exemplary systems can choose which building facets and building facet lines to replace, repair, or take some other action; which linked building facets and building facet lines to replace, repair, or take some other action; and aggregate the replace and repair quantities, reducing human error. This small facet can now act as either direction that it is tagged with. When portions of a roof are being replaced, some facets will have this multi-direction flexibility for being replaced. This flexibility is important for visual, logical, and installation purposes.

Each building facet has associated lines, for example eaves, rakes, valleys, ridges, pitch transition, flashing, step flashing, and the like. When a building facet is assigned for replacement, its associated lines may be assigned for replacement as well. This assignment can depend on line type, line size, line location, some other line characteristic, or a combination thereof. As discussed above, building facets can be coded, for example, color coded, to represent replacement, repair, not damaged, or some other indicator. A line can similarly be coded to represent the repair indicator assigned to the line.

In addition to reassigning directionality based on a sliver threshold, a repair indicator can also be set based on a sliver threshold. A sliver threshold for repair indicators can be based on a geometric value of the building facet, for example size, including the number of shingles or other material units for the particular facet or facet area; replacement cost of the building facet; replacement cost for the building facet's associated lines; repair cost of the building facet; repair cost for the building facet's associated lines; are a combination thereof. A repair indicator can be set for each building facet individually. If a building facet is set for replace, repair indicators can also be evaluated for building facets linked to that building facet. Criteria for evaluating the repair indicator for linked building facets can include the linked building facets current repair indicator, if there is one; the directionality of the linked building facet; the area or size of the linked building facets; cost to repair or replace the linked building facet; material type of the linked building facet, and the like. Those of skill in the art can appreciate the different inputs to a repair indicator that can be required.

As an example, a linked building facet that has a repair indicator of "REPAIR" or "NOT DAMAGED" can be analyzed to see if it meets the sliver threshold criteria for reassigning its repair indicator from "REPAIR" or "NOT DAMAGED" to "REPLACE." If the building facet does meet the replacement sliver threshold, then the building facet and its associated lines can be given a repair indicator of "REPLACE." That building facet's directionality can then be reassigned to the directionality of the linked building facet that triggered the replacement.

Some embodiments can include material tagging. For example, based on a building facet's surface area material, the building facet and facet lines can be tagged with material for installation in the event the building facet and/or facet lines are assigned a "REPLACE," "REPAIR," or other repair indicator indicating material replacement or repair or other setting which could result in material installation requirements. The type of materials that a building facet can be tagged with include exterior, exterior layer, interior, interior layer, and the like. For example, types of materials that a building facet can be tagged with include shingles, felt, decking, ice and water shield, additional shingle layers, siding, drywall, insulation, and the like. Material tagging, like repair decisions and directionality can be accomplished automatically by correlating inspection data or some other data to CAD image data. Further, it can be accomplished by coding a building facet using color coding, pattern coding, number coding, word or text coding, shade coding, brightness coding and the like.

Referring still to FIG. 3, a system can include building material and building material type options for a user to customize material tagging for one or more building facets. A building facet can be tagged with a "REPLACE" repair indicator and the system can provide options for assigning one or more building material types to the building facet. For example, building facet 215 can be automatically assigned a "REPAIR" repair indicator and automatically tagged with a building material of shingles. The system can provide the ability to tag the building facet 215 with a "REPLACE" repair indicator and building materials of shingles and water shield. Further, the installation procedures of some building materials require the installation of other, related building materials. As a result, tagging a building facet, either automatically or otherwise, with a particular building material or building material type can result in automatically tagging the building facet with one or more other building materials or building material types. For example, if building facet 215 is tagged with laminated shingles, building facet 215 can be automatically tagged with felt and decking building materials. In some embodiments, information related to the tagged building materials of a building facet can include information related to the installation requirements of the building materials. For example, the information related to the building materials with which building facet 215 is tagged can include information that the felt and decking should be installed under the shingles, in a certain manner, and the like. Those of skill in the art can readily appreciate the permutations of building material information with which a building facet can be tagged.

In some embodiments, building facet lines can also be tagged with directionality and repair indicators similar to building facets. As well, building facet lines can be assigned a line type, for example, hip, rake, eave, ridge, and the like. Line type information can be displayed via information panel 270, using coding in a CAD image as discussed herein, or some other graphical depiction. Likewise, building facet lines can be tagged with building material settings. Building facet lines can be tagged with material types as well as specific materials. For example, building facet lines can be tagged with shingle starter strips, drip edge, gutter, gutter guard, soffit, siding trim, and the like. Other information can include the material which makes up the building material. For example, additional tagging can include wood shingle, asphalt shingle, metal gutter, fiberglass gutter, and the like.

Furthermore, where a building facet is tagged with building materials or building material types, a building facet line linked to the building facet can be automatically tagged with a building material or building material type based on the building material or building material type with which the building facet is tagged. For example, a building facet can be tagged with shingles. Because a shingle installation procedure recommends installation of a drip edge on eave and rake lines, any eave and rake building facet lines linked to the building facet can then be automatically tagged with a drip edge.

Figure 4A:
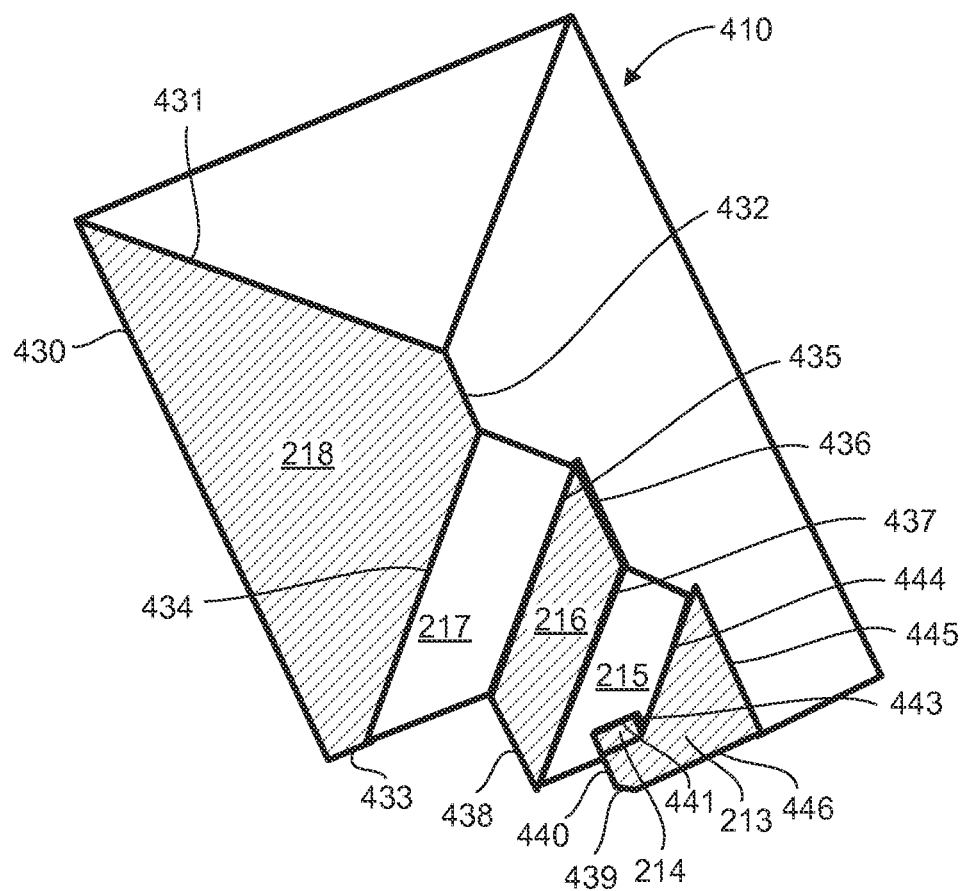
FIGS. 4A and 4B show CAD images of roof facets coded with repair indicators according to illustrative embodiments of the invention.
Figure 4B:
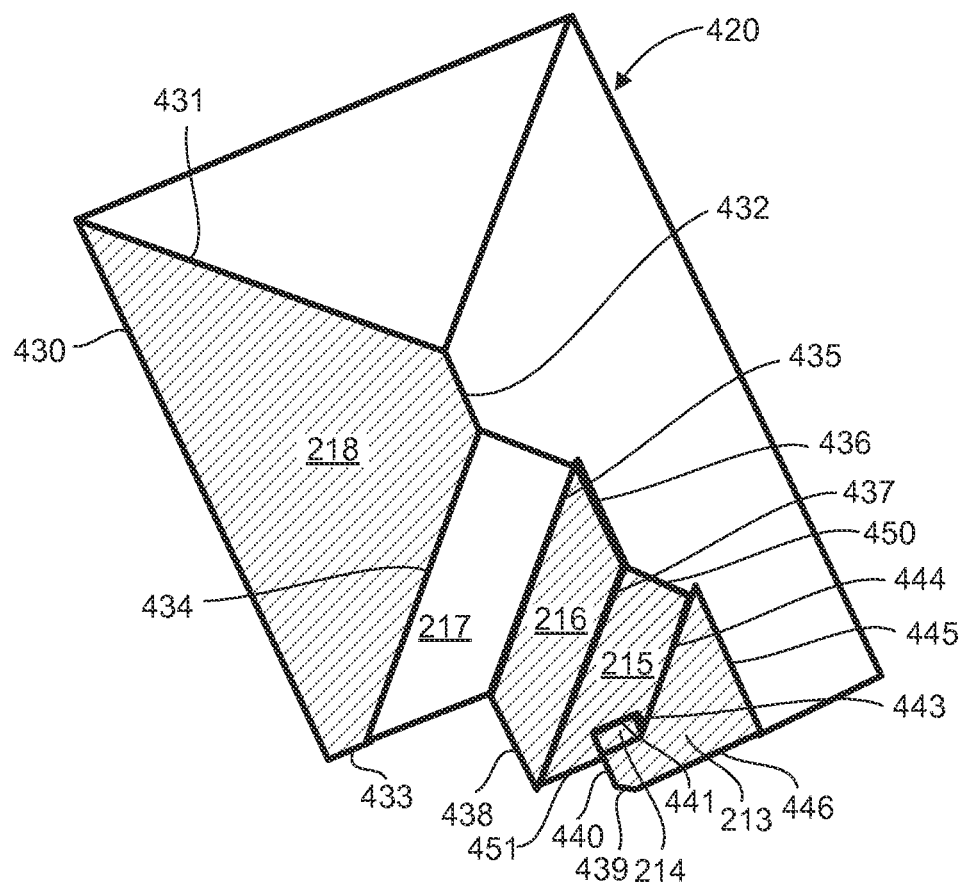

FIGS. 4A and 4B can be used to illustrate reassignment of directionality but also repair indicators. In particular, FIGS. 4A and 4B can represent an example of how a secondary building facet is assigned a repair indicator of a primary building facet based on building facet directionality, sliver detection, a repair indicator, or a combination thereof. Each of building facets 213, including facet portion 214, 216, and 218 can have the same actual directionality. Each of building facets 213, including facet portion 214, 216, and 218 can then be assigned the same "REPLACE" repair indicator. Each of lines 430-446, being associated with building facets 213, 216, and 218 and facet portion 214 can also be assigned a "REPLACE" repair indicator by virtue of being associated with building facets assigned a "REPLACE" repair indicator.

Building facet 215 in CAD image 410 is not assigned a "REPLACE" repair indicator. In CAD image 410 this is indicated by a lack of coding of building facet 215. This can mean building facet 215 of CAD image 410 is not damaged and should not be replaced. Because building facet 215 is linked to a building facet with a directionality that results in a "REPLACE" repair indicator, building facet 215 can have its repair indicator reassigned to "REPLACE" as shown in CAD image 420. For example, if a 200 square foot replacement sliver threshold is set, and building facet 215 has an area of 180 square feet, then building facet 215 and its associated lines 450, 451 can also be reassigned a "REPLACE" repair indicator as shown in CAD image 320. Lines 437, 444, 443, 441, and 440, already associated with building facets assigned a "REPLACE" repair indicator, are already assigned a "REPLACE" repair indicator. Accordingly, determinations of required material quantity, type, replacement cost, and other data related to replacement take into account the additional building facet 215 and its new associated lines 450, 451.

Figure 5:
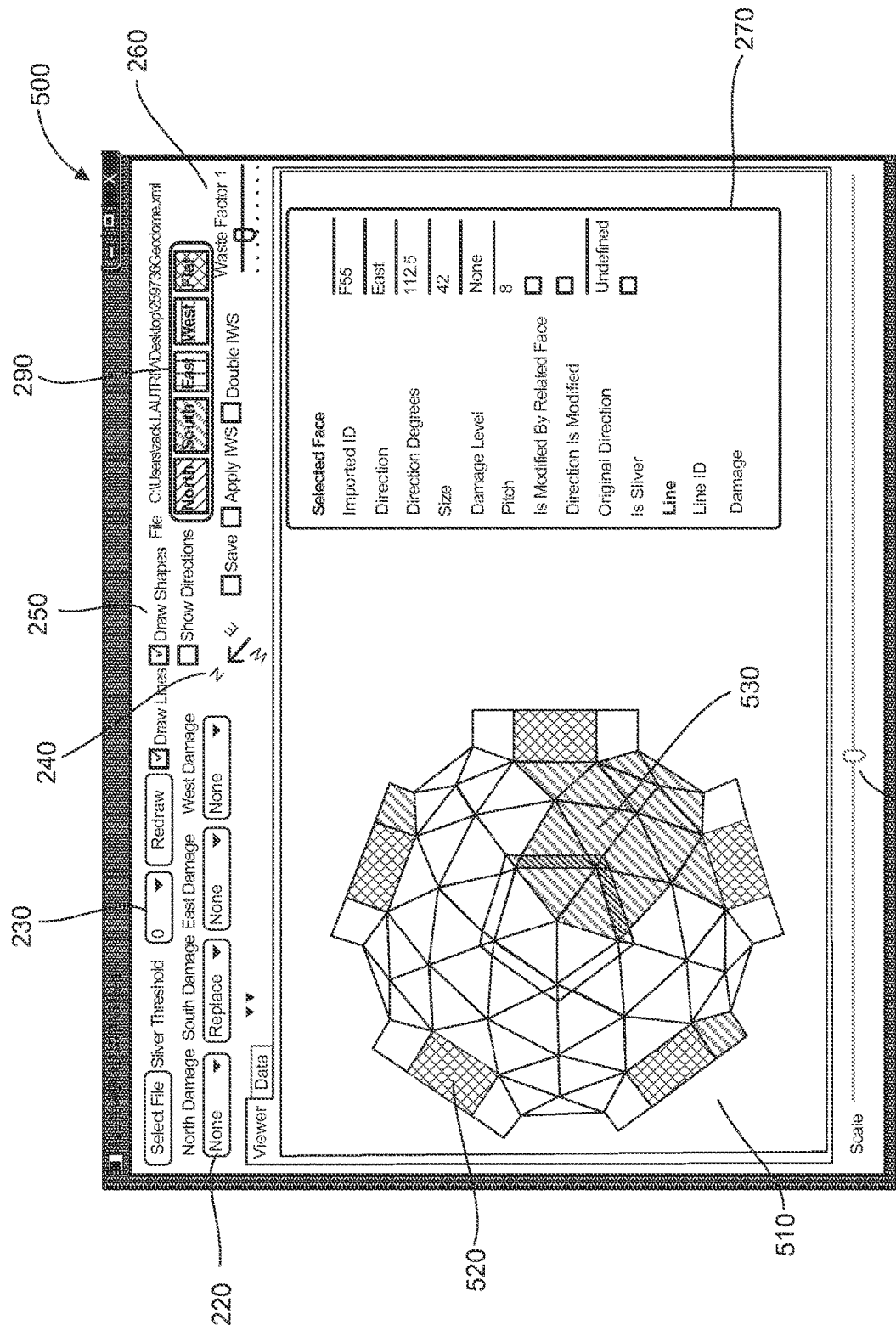

Referring now to FIG. 5, an exemplary embodiment of a portion of the system is shown including CAD image 510. It can be seen that repair indicators 220 are set so that south-facing building facets are assigned to "REPLACE." Accordingly, all of the building facets of CAD image 510 that substantially face south are coded for "REPLACE." Note that actual directionality can be determined by compass indicator 240. It can also be seen that sliver threshold option 230 is set to 0. The embodiment of FIG. 5 allows sliver thresholds set according to square footage of a building facet. Each of the building facets with a directionality setting of South and their associated lines are coded with shading to indicate a "REPLACE" repair indicator.

Figure 6:
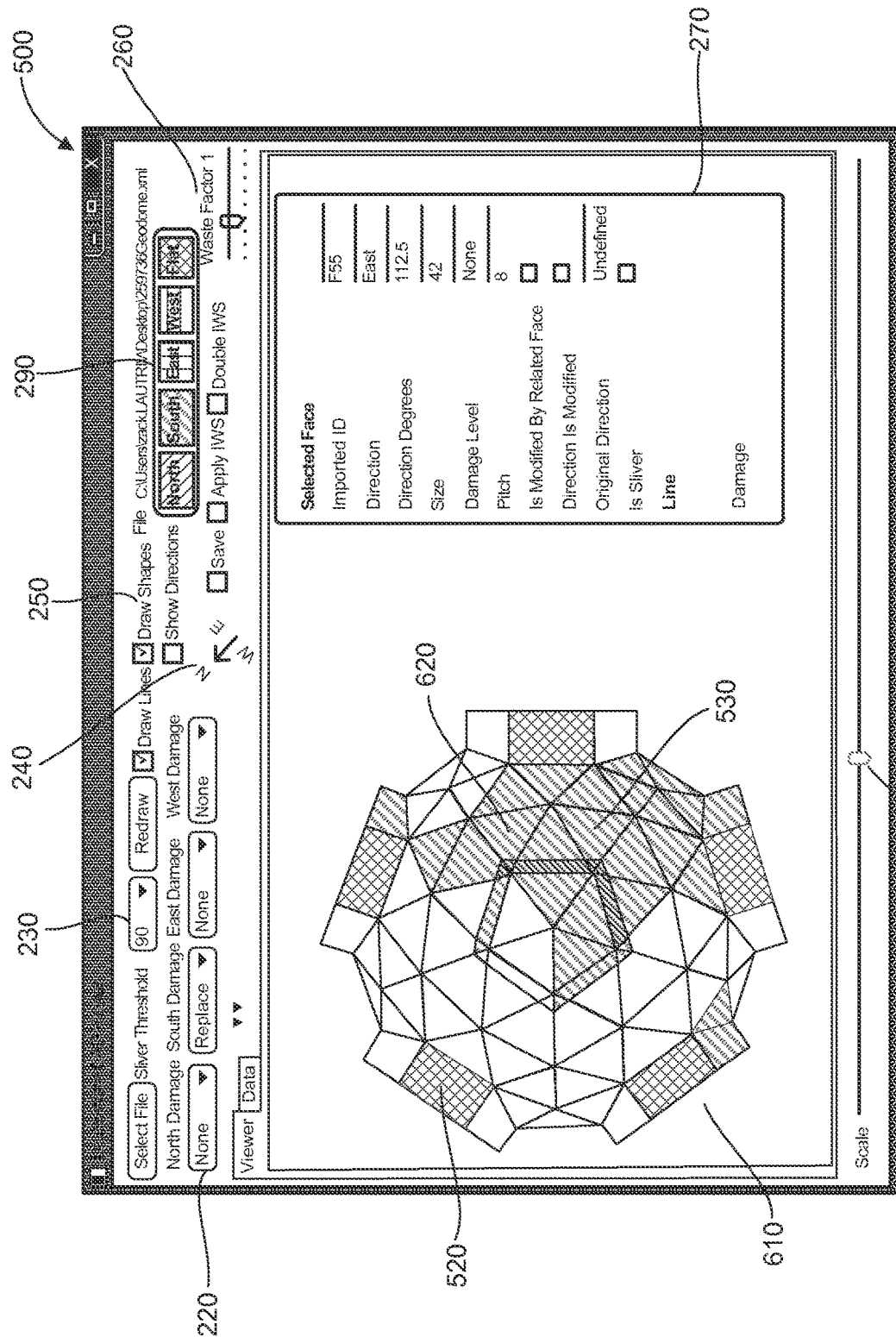

Referring now to FIG. 6, the sliver threshold option 230 is set to 90 square feet. Consequently, each building facet adjacent to a building facet with a directionality of South is assigned a "REPLACE" repair indicators and is coded in the CAD image 610. For example, building facet 620, an east-facing building facet has its repair indicator reassigned to "REPLACE," indicated by recoding it as south-facing. In a preferred embodiment, all building facets are reviewed to determine whether reassignment of the repair indicator is necessary or desirable. In others, a subset of building facets can be reviewed. Additionally, in a preferred embodiment the line types for each building facet is reviewed. Again, in other embodiments, a subset of line types or lines for each building facet or all line types or lines for a subset of building facets can be reviewed. If a line type or line is determined to be a specific line type and the line links building facets that are assigned different directionalities, then the size of each of those building facets can be compared against the sliver threshold set in sliver threshold option 230. In other embodiments other building facet characteristics, as already discussed herein, can be compared. Likewise, a predetermined sliver threshold can be used for comparison.

In a preferred embodiment, if the size of either building facet in a pair of adjacent building facets is below the sliver threshold set in sliver threshold option 230, then the building facet whose size falls below the sliver threshold is reassigned with the directionality of the other building facet. Again, other characteristics can be used for reassignment determinations. For example, in some embodiments, the determination can be based on degrees from normal to the directionality of the adjacent building facet, the length of the outline of the building facet that contacts other building facets already assigned with a repair indicator, size of the building facet, other characteristics, or a combination thereof.

When reassigning the repair indicator, a building facet below the sliver threshold which is linked to a building facet that has a different directionality, now has two or more directionalities (i.e., its original directionality and the directionality of the linked building facet). In a preferred embodiment, building facets assigned with multiple directionalities can act in accordance with any of the assigned directionalities. Furthermore, multi-directional building facets can take on a damage type based on the damage type priority level set in the system. For example, in FIG. 6 is shown building facet 620 that has an original directionality of east and is assigned a directionality of south and is assigned a "REPLACE" repair indicator. The corresponding building facet of FIG. 5 was originally not damaged. However, FIG. 6 illustrates a preferred embodiment in which a sliver threshold is set and building facet 620 acts in accordance with a building facet with a south directionality and, thus, is assigned a "REPLACE" repair indicator.

Figure 7:
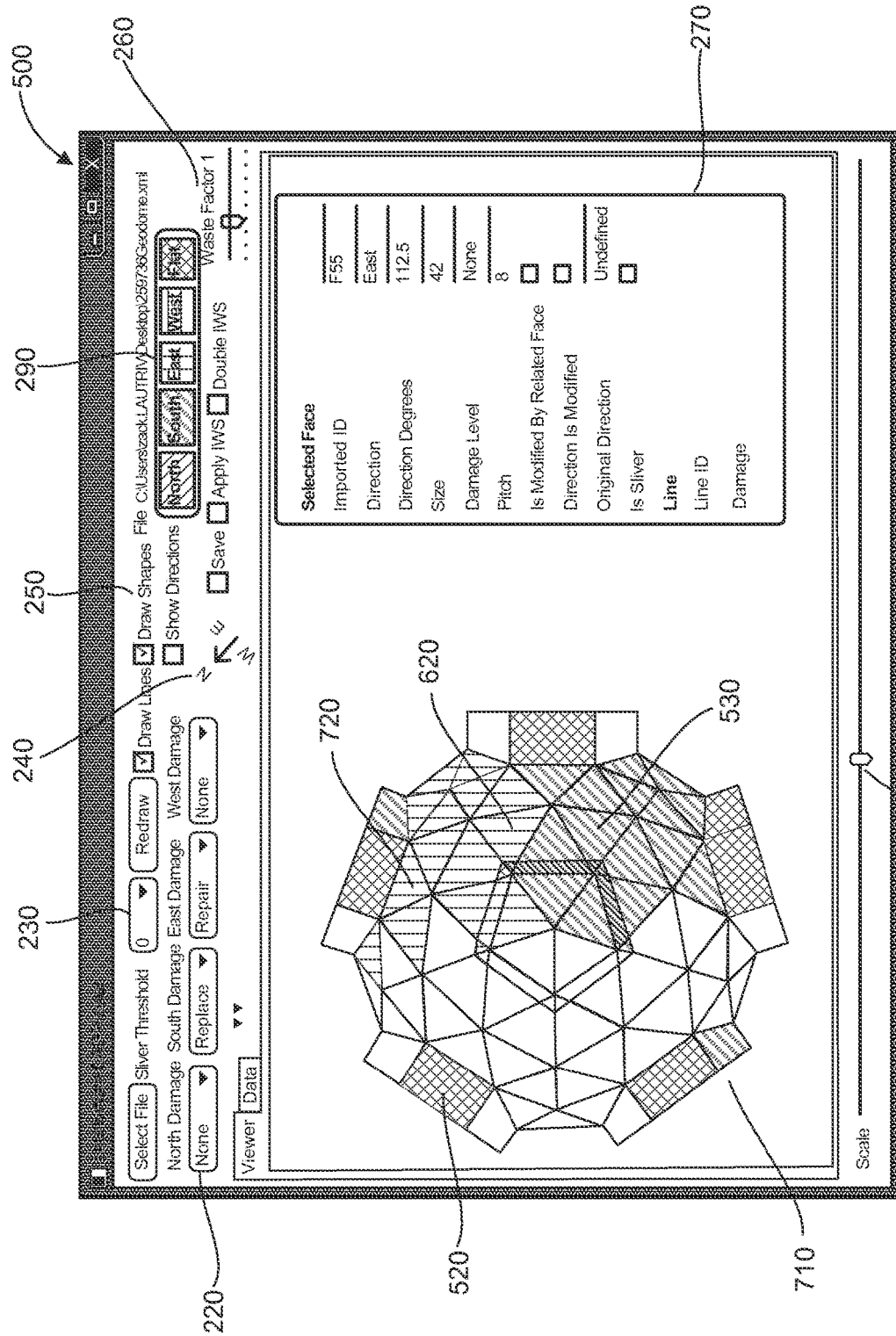

Referring now to FIG. 7, a portion of an exemplary system is shown in which the repair indicator option 220 is set so that building facets with an assigned directionality of south are assigned a "REPLACE" repair indicator and building facets with an assigned directionality of east are assigned a "REPAIR" repair indicator. In the example of FIG. 7, sliver threshold option 230 is set to 0. Consequently, each building facets with a directionality of either south or east is assigned its respective repair indicator according to repair indicator option 220. For example, building facet 620 which substantially faces east is coded to indicate it is assigned a directionality of east and a repair indicator of "REPAIR." Likewise, building facet 720, which also substantially faces east is similarly assigned. Each of the assigned repair indicators is indicated by different coding. For example, building facet 530 is assigned a repair indicator of "REPLACE" and has a different coding than building facets 620 and 720. In the example illustrated in FIG. 7, building facets assigned a repair indicator of "REPLACE" are coded with a backward-diagonal line pattern and building facets assigned a replace setting of "REPAIR" are coded with a vertical line pattern. In other embodiments, coding can be accomplished using other types of coding discussed herein.

Figure 8:
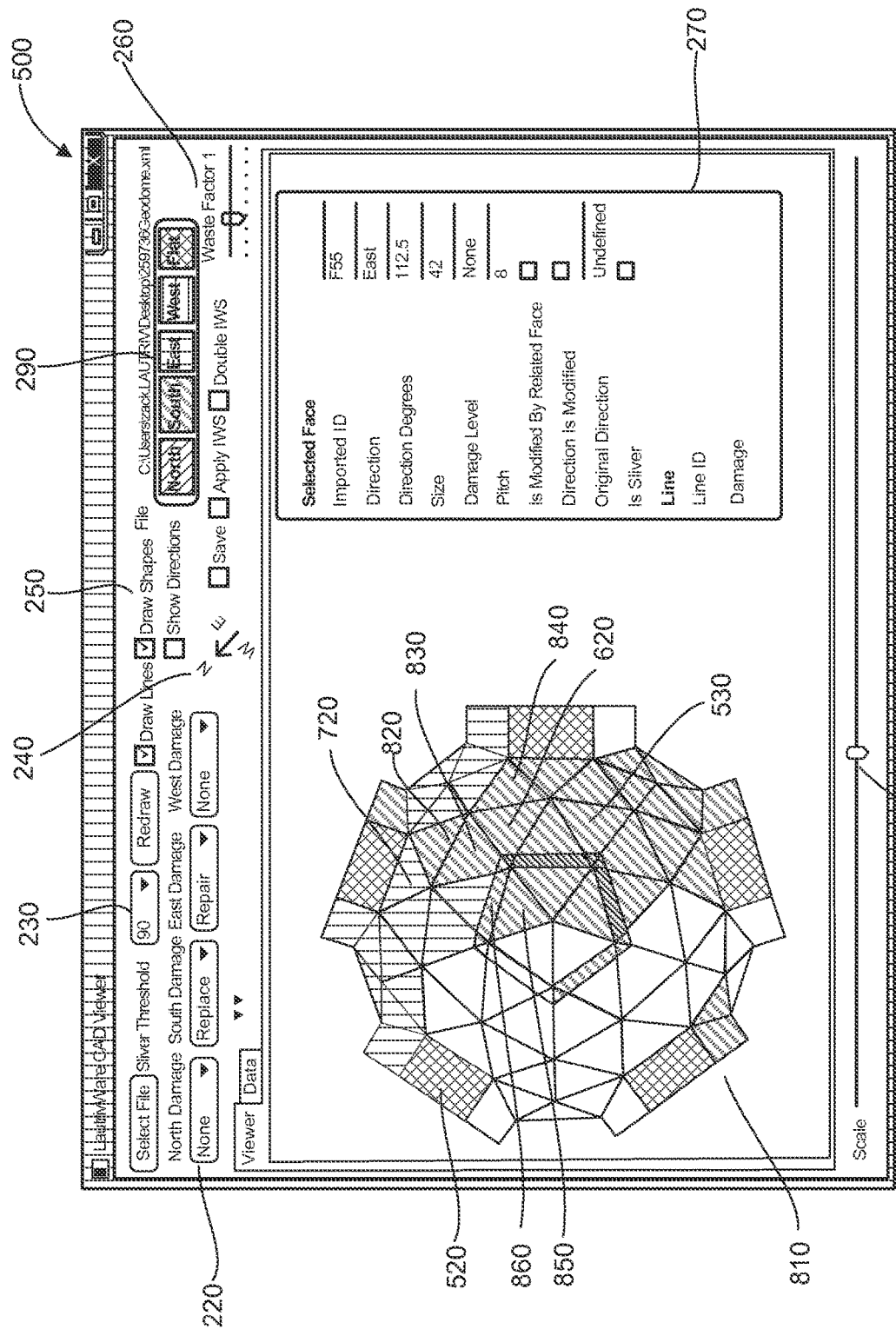

Referring now to FIG. 8, the sliver threshold option 230 is set to 90 square feet. In this example shown, each building facet 820-860 falls below the sliver threshold set in sliver threshold option 230. Consequently, each building facet 820-860 linked to a building facet assigned with a "REPLACE" repair indicator is reassigned a "REPLACE" repair indicator and is coded accordingly. The reassignment of repair indicators of building facets 820-860 can also be based on a repair indicator priority discussed above. Here, the "REPLACE" repair indicator can have a higher priority than "REPAIR." As a result, building facets 820-860 were reassigned a repair indicator rather than other building facets that are adjacent to building facets 820-860.

After building facets and lines are assigned a particular repair indicator, the quantity of building material needed to perform replacements or repair can be determined. This determination can be made using CAD data, including aerial CAD data. Further, the determination can include determining waste quantity. In some embodiments, building material amounts are calculated for all building facets assigned a "REPLACE" repair indicator. In other embodiments, the calculation can be based on a subset of building facets or using other repair indicators. Furthermore, other embodiments may calculate building material amounts for one or more specific building facets. Particular installation procedures for the building facet, building facet line, building material, building material type, or some combination of them can be reviewed to determine a method for calculation.

Figure 9:
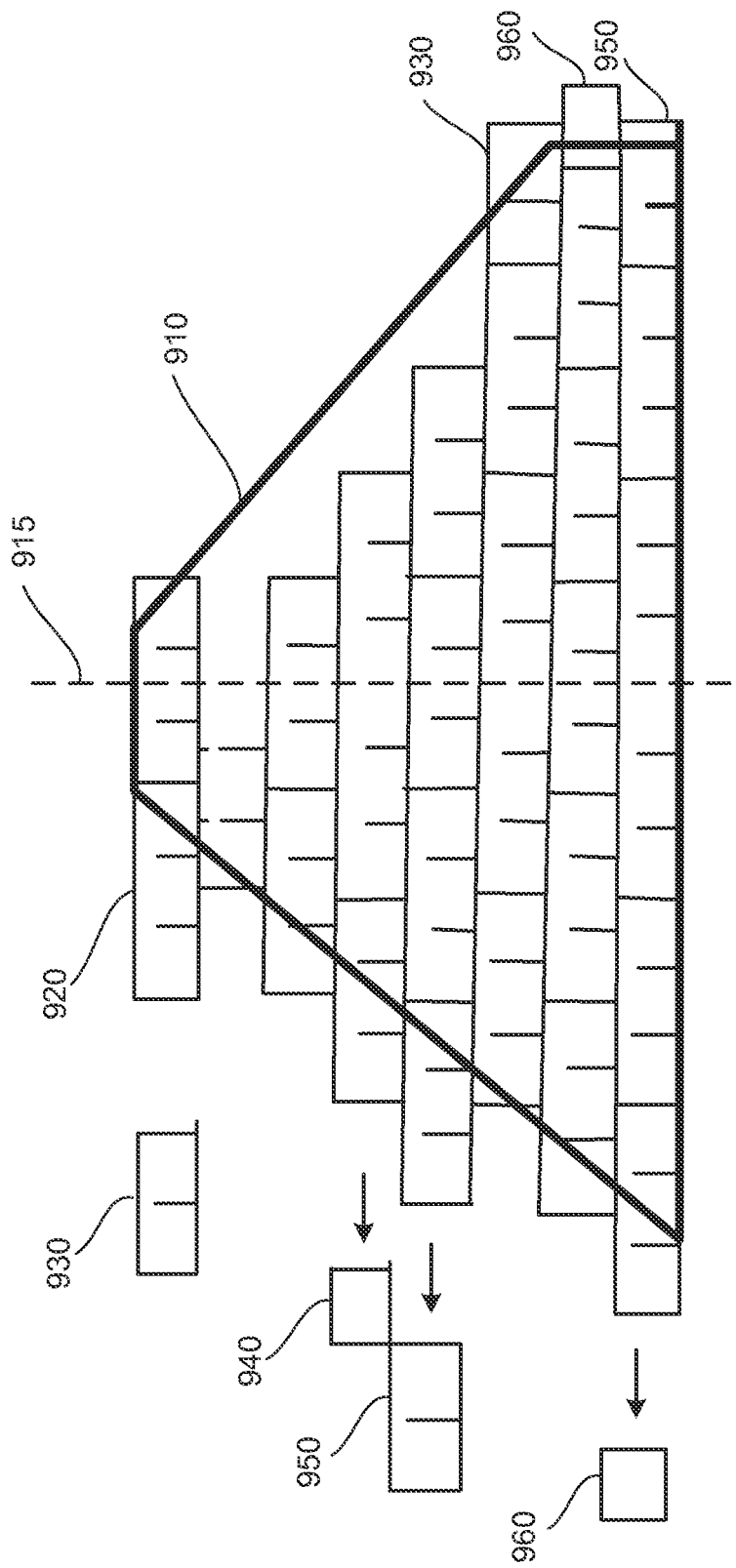
FIG. 9 shows a schematic of a roof facet and a roofing material pattern illustrating a computer-based method for determining material use and reuse requirements and material waste in accordance with an illustrative embodiment of the invention.

In FIG. 9, a schematic of a building facet set for a "REPLACE" repair indicator is shown in which waste material is determined in accordance with an embodiment of the present invention. FIG. 9 illustrates a building material pattern 920 of three tab shingles, which is the most common shingle type. Specifically, roofing material 920 is laid out on a roof facet 910 in a standard fashion from center 915 to left. Excess roofing material is trimmed and placed on the right side of the roof facet 910. Unused portions 930, 950, and 960 are determined to fit spaces on the right side. Any additional excess roofing material trimmings, including unused portion 940, are saved for other facets or ridges. In some embodiments, building material quantity with waste is calculated exactly for all building facets and lines to be replaced. In other embodiments, building material quantity is calculated without waste. In yet other embodiments, calculations are made for a subset of building facets, lines, or both. Those of skill in the art can appreciate that the calculations required for different material types may vary but that the overall method for determining building material amounts does not. Schematics such as roof facet 910 and building material portions 930-960 can be displayed and manipulated via CAD image similar to CAD image 210, 410, 420, 510, 610, 710, 810.

The roofing material pattern 920 includes shingles in rows. Each row is offset from the row above and below it. The height of each row is set to a predetermined height depending on the reveal of the shingle type. The height can also depend on the size and type of the shingles. Shingle placement starts from a center line 915 and shingles are placed both to the right and left of that center line. Shingles are placed to the left of the center line 915 until all of the left side of roof facet 910 in that row is covered by shingles. Shingles are also placed to the right of the center line 915, but the shingles to the right do not get placed if the whole shingle does not fit in the roof facet 910.

The shingles placed on the left side of the roof facet 910 that go outside of the roof facet 910 are cut at the roof facet line and then squared off. In the example illustrated in FIG. 9, if a squared off partial shingle is less than one foot wide, then it is considered waste and it will not be used in the next step of the process. Those of skill in the art understand that limits other than one foot can be appropriate for other shingle types and materials, other roofing types and materials, and other building material types and materials.

The squared off shingles 930-960 that are one foot wide or more are now placed in the rows on the right hand side of the roof facet. Each of unused shingle portions 930, 950, and 960 can be placed in a row on the right hand side. Unused shingle portion 940 is not placed in any row because each of the other rows requires more than a one-foot partial shingle. Accordingly, unused shingle portion 940 can be saved for use on another roof facet, for a ridge cap, or some other building facet or line. When the roofing material placement process is completed for all roof facets assigned a "REPLACE" repair indicator, there will be unused shingle portions left over that can be used as ridge cap material. There will also be some roof facets that are not covered with roofing material on the right hand side. Full shingles are used to complete these rows and any shingle quantity outside of the right hand side of the roof facet is squared off and used for ridge cap material, if they are one foot or more wide.

Returning again to FIG. 4B, shingles can be placed along the eaves that are assigned a "REPLACE" repair indicator. In FIG. 4B, lines 430, 438, and 440 of roof facet CAD image 420 are eave lines. When installing roofing material, a starter strip of shingles is placed on the eaves. One row of shingles is placed along each of these eaves, and the excess shingles are cut and squared off. Any partial shingle less than one foot is discarded as waste. The partial shingles that are one square foot or greater are saved for the ridge cap.

The system then adds up the hip and ridge lines that need to be replaced. In FIG. 4B, the lengths of lines 431, 432, 434, 436, 437, 445, and 450 are summed Single shingle tabs, from three-tab shingles can be placed in an overlapping manner with about five inches of reveal over the hip and ridge lines. For each partially-used shingle from other building facets and lines, it can be determined if the partially-used shingle can be reused. In some embodiments, if a partially-used shingle has a length greater than a tab length but less than two times the tab length, then the partially-used shingle can be considered to have one tab. In other embodiments, the amount of shingle considered reusable can be based on some other predetermined minimum, predetermined maximum, or both. For example, for a three-tab shingle with one-foot tabs, where the partially-used shingle has a length greater than one foot, but less than two feet, then the partially-used shingle is considered to have one tab. If the partially-used shingle is two feet or greater, then the shingle is considered to have two tabs.

The number of tabs required for the roof line, can be determined by dividing the aggregate length of the roof lines to be replaced by the reveal on those lines. For example, for the roof facet CAD image 420 in FIG. 4B, the sum length of hip and ridge lines 431, 432, 434, 436, 437, 445, and 450 is divided by five inches, which is the reveal for three-tab shingles with one-foot tabs, to determine the number of tabs needed to cover those lines 431, 432, 434, 436, 437, 445, and 450. The number of tabs generated from the partially-used shingles is subtracted from the quantity of tabs needed to cover the hip and ridge lines 431, 432, 434, 436, 437, 445, and 450. The number of additional whole shingles can then be calculated to cover the remainder of the hip and ridge lines 431, 432, 434, 436, 437, 445, and 450. For the roof facet CAD image 420 of FIG. 4B, each shingle has three tabs; therefore the number of additional tabs needed to cover the hip and ridge lines 431, 432, 434, 436, 437, 445, and 450 is divided by three. This number can then be rounded up to the nearest whole number. Those of skill in the art can understand that depending on the type of shingles used, the determination of tabs required for roof facet lines can change. For example, if the roof material required is a four-tab shingle, the number of additional tabs needed would be divided by four.

In another embodiment, the quantity of building material can be determined by virtualizing the piece-by-piece installation procedure on the building facet or building facet line. For example, referring back to FIG. 4B, building facet line 430, which is an eave line, can be tagged with a "REPLACE" repair indicator. Building facet line 430 further can be tagged with building materials drip edge, ice and water shield, gutter, soffit, and the like. In this example, drip edge material lengths can be laid out on CAD image 420 in to-scale eight-foot-long pieces and trimmed at the end of the line. A left over trimmed piece of drip edge can be installed on other building facet lines tagged with building material drip edge to avoid waste. When building facet line materials are reused can depend on minimum required installation length based on installation procedures or requirements for the building material, building material type, building code requirements, and the like.

Figure 10:
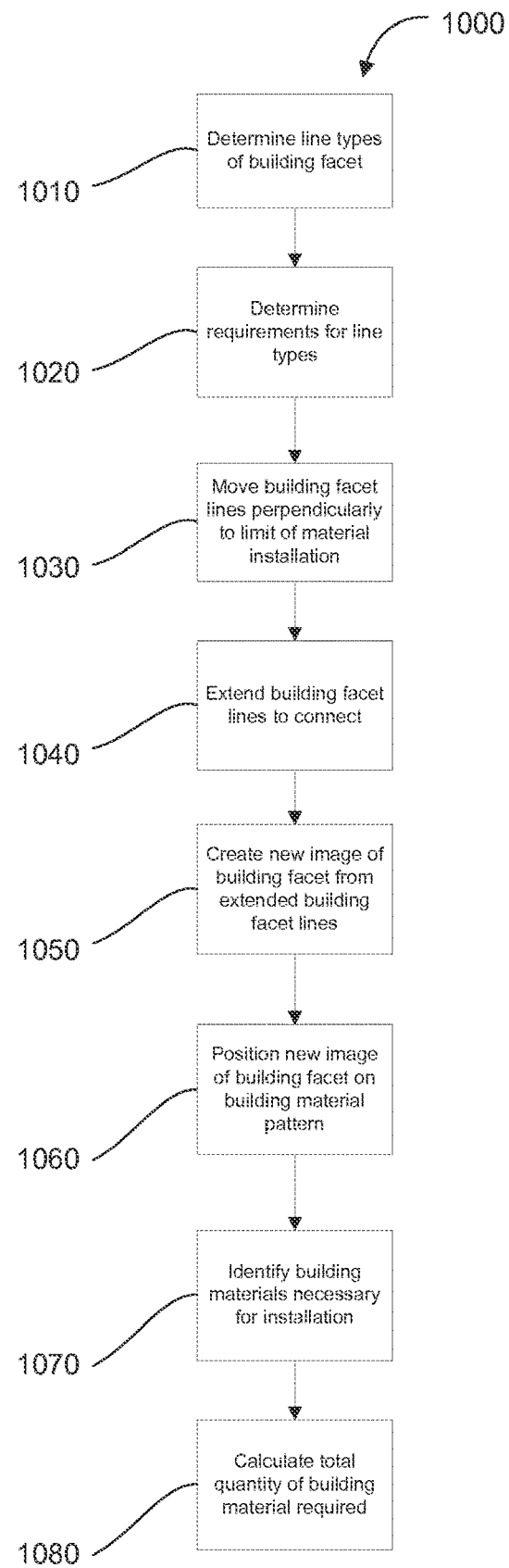
FIG. 10 shows a flowchart of a method for determining the amount of building materials required for installation for the replacement of a building facet in accordance with an illustrative embodiment of the invention.

Referring now to FIG. 10, a method for determining required building materials 1000 in accordance with a preferred embodiment is shown. In some embodiments the calculated material installation quantities are actual quantities with waste amounts. In other embodiments, waste amounts can be omitted. Although the embodiment shown in FIG. 10 illustrates a particular order for blocks 1010-1080, the order illustrated in the flowchart is by way of example only and the blocks and/or steps within blocks do not have to be executed in a particular order or at a particular time. In some embodiments, blocks 1010-1080 or a subset thereof can be performed iteratively to refine the calculated material installation quantities.

In a preferred embodiment, a building materials database 132 is maintained as discussed above. The determination of material quantity can be based on the area of the building facet and building materials data 132 related to the particular building material required for replacement. Such building material data can include the type of building material, and the size of the building material unit. In particular for roofing building facets, a preferred embodiment considers roofing materials length, width, installation exposure, installation course offset, and installation rules for each roof facet line type in the building materials database 132.

Figure 11A:
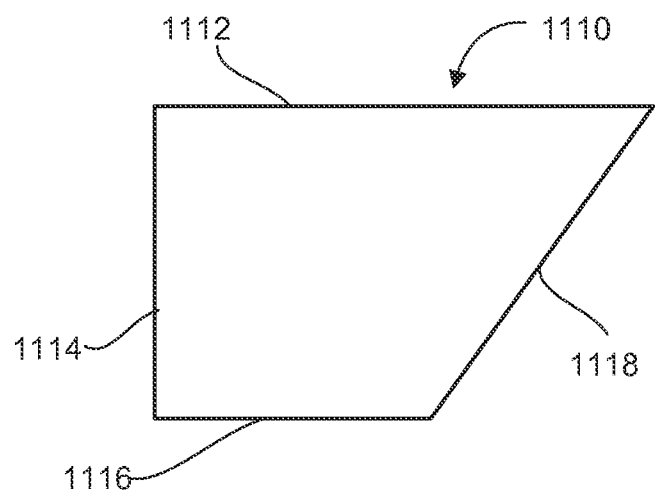
FIGS. 11A-E show schematics of a roof facet's lines adjusted to create a facet area to determine the amount of building materials required for installation for the replacement of the roof facet in accordance with an illustrative embodiment of the invention.

The line types of the building facet are determined 1010. For example, FIG. 11A illustrates a building facet assigned to be replaced and that includes a ridge line 1112, a rake 1114, an eave 1116, and a valley 1118. In accordance with the embodiment illustrated in FIG. 10, each of those line types would be identified.

The surface area installation requirements for each line type are determined 1020. The determination of material quantity can be based on a building facet's line types to see if there are any building material installation rules based on the building material type being installed on the building facet. Such installation rules can include material installation best practices, material manufacturer's required installation procedures, its recommended installation procedures, or a combination thereof. In some embodiments installation rules can be obtained directly from a material manufacturer database 160 via a communications link. In other embodiments, installation rules can be stored locally, such as in storage medium 130 or building materials database 132.

Depending on the line type and the building material type, installation may require that the building material be installed prior to, at, or past a building facet line. In order to calculate the building material needed for installation on a building facet, an exemplary system, in accordance with a preferred embodiment of the present invention can adjust the size of the building facet by moving or extending the building facet's lines so that the true roofing material installation area is represented.

Figure 11B:
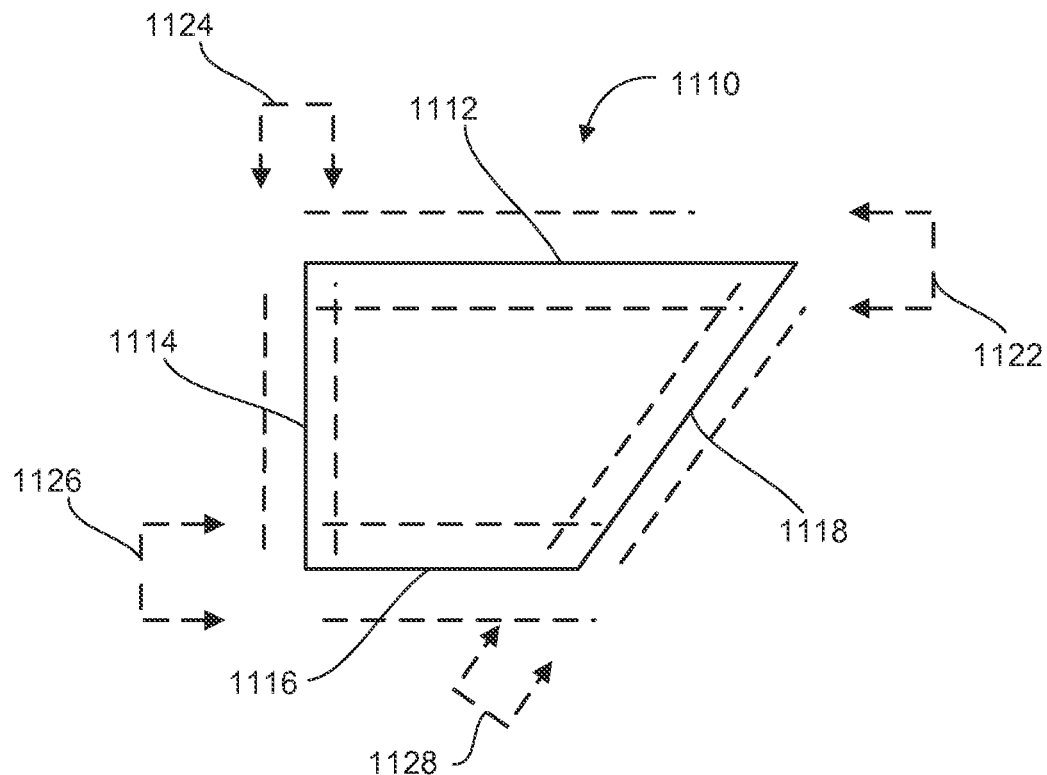

The building facet lines are moved perpendicularly 1030. The extent of the movement of each line represents where building material should be installed to. For example, in FIG. 11B is shown an illustration of the potential extent of each of lines 1112-1118 associated with a roof facet 1110. Ridge line 1112 can be extended perpendicularly a distance 1122 in either direction from its original position. Similarly, rake line 1114 can be extended a distance 1124, eave line 1116 can be extended a distance 1126, and valley line 1118 can be extended a distance 1128. Depending on the roof facet line type and the roofing material installation rules, a roof facet line may be moved outward or inward to the point of roofing material installation.

Figure 11C:
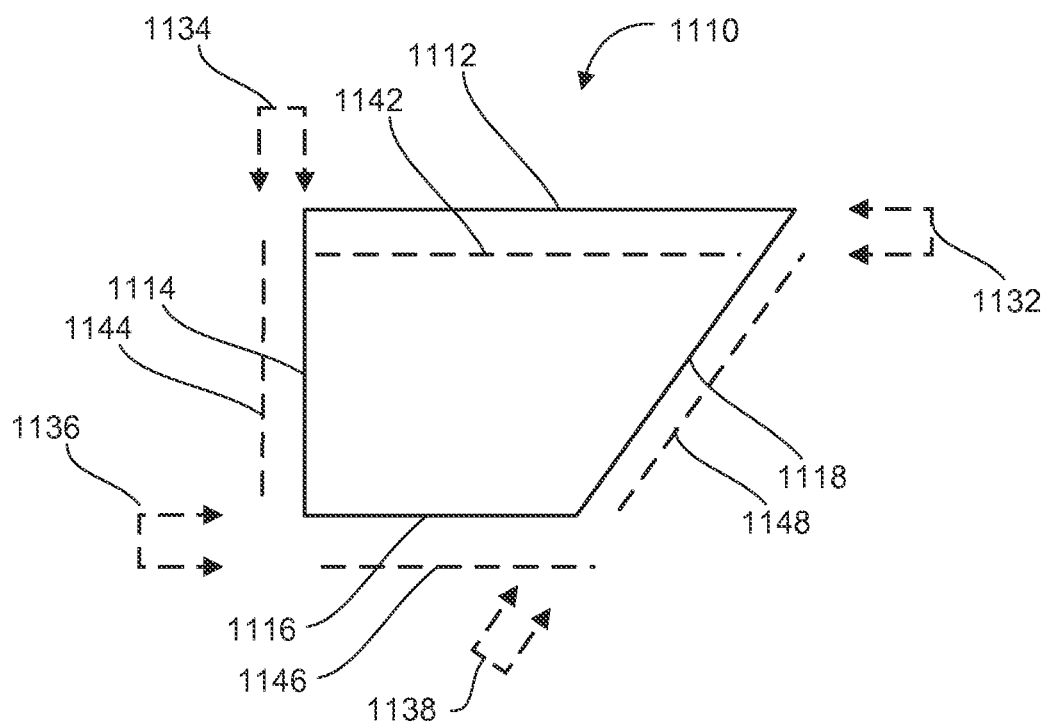

Specifically, as shown in FIG. 11C, the eave line 1116 requires that roofing material extend a three-inch distance 1136 past the eave line 1116 and is moved to eave line 1146. The rake line 1114 requires that roofing material extend a two-inch distance 1134 past the rake line 1114 and is moved to rake line 1144. The ridge line 1112 requires that roofing material installation stop a six-inch distance 1132 before the ridge line 1112 and is moved to ridge line 1142. And the valley line 1118 requires that roofing material be installed a twelve-inch distance 1138 past the valley line 1118 and is moved to valley line 1148.

Figure 11D:
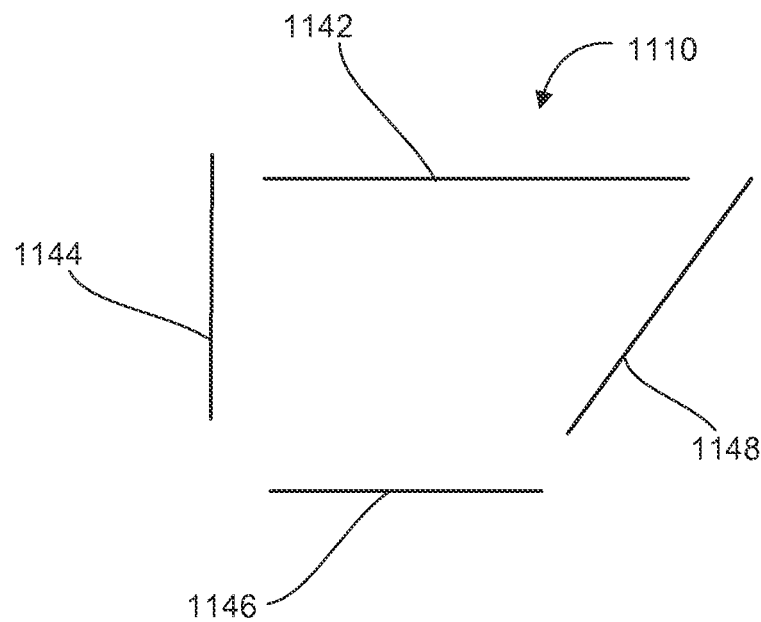
Figure 11E:
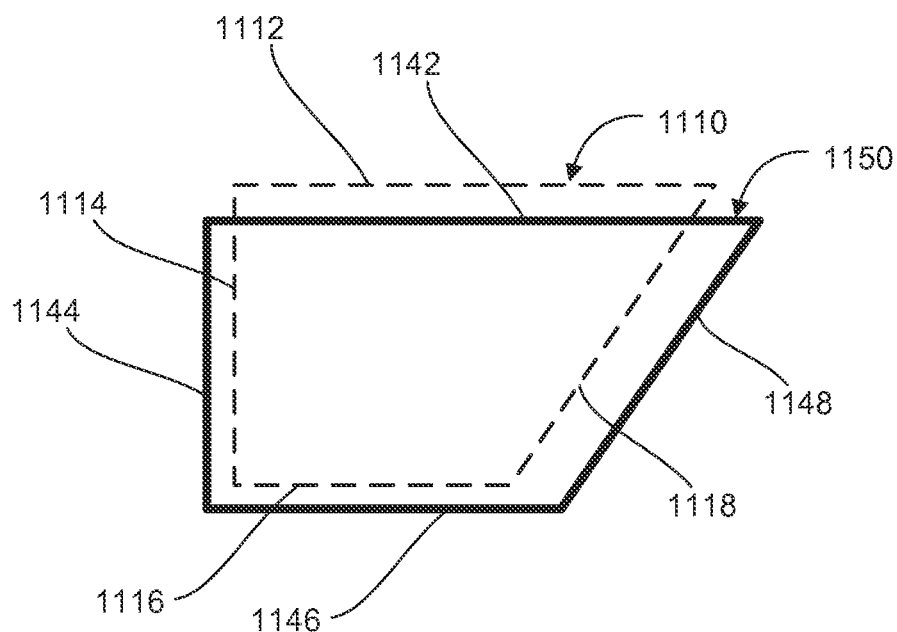

Each building facet line is then extended 1040 so that the lines are connected. Each line can be extended either outward to reach a connecting line that has been moved out or extended inward to reach a connecting line that has been moved in. For example, FIG. 11D illustrates the new position of moved lines 1142-1148. A new building facet image is created 1150 from the extended building facet lines. FIG. 11E illustrates a new building facet image 1150 adjusted for the roofing material installation requirements.

Figure 12:
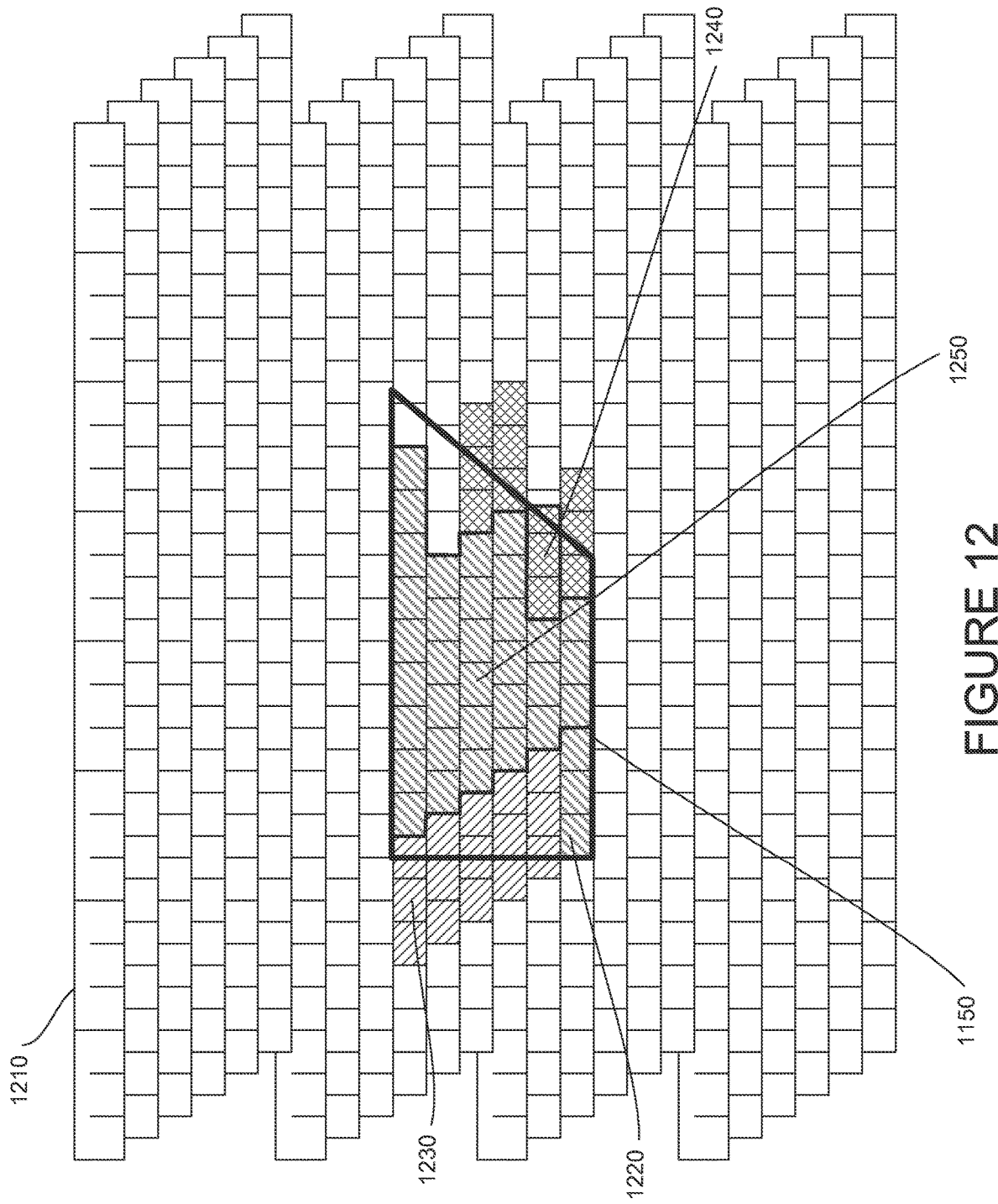
FIG. 12 shows a schematic of the roof facet from FIGS. 11A-E superimposed on a shingle pattern for determining shingle use and reuse requirements and shingle waste in accordance with an illustrative embodiment of the invention.

The new building facet image is positioned on a building material pattern 1060. As an example, in FIG. 12 is shown a roofing material pattern 1210 based on the roofing material to be installed on the roof facet 1150. In this step, a preferred embodiment will include determining the building material's width, length, exposure, and each installation course's offset. Using that information, a building material pattern is created. The example shown in FIG. 12 is based on a typical three tab shingle with a length of 36 inches, a width of 12 inches, an offset of 6 inches, and an exposure of 5.5 inches. Building material patterns for other shingle types, roofing types, or other building material types can be created. For example, a building material pattern can be created and used for siding material.

Returning to FIG. 10, as part of positioning the building facet image on the building material pattern 1060, the building facet is first oriented on the building material pattern so that the building facet and the building material pattern are vertically aligned. For example, in FIG. 12, the roof facet 1150 is positioned so that its downward slope points down and is perpendicular with the horizontal roofing material courses of roofing material pattern 1210.

As part of positioning the building facet image on the building material pattern 1060, the building facet can be lined up vertically with a particular piece of building material in the pattern so that the building facet's bottom-most point is placed on the bottom horizontal line of building material. For example, as shown in FIG. 12, roof facet 1150 is lined up with shingle 1220 at the bottom of each.

Also as part of positioning the building facet image on the building material pattern 1060, a determination of how to position the building facet horizontally is made. In some embodiments, a building facet may be positioned to line up with the left side of building material, the right side of building material, centered with building material, or offset by some predetermined distance from a predetermine point in the building material. For left alignment of the building facet, the building facet is moved horizontally so that the building facet's left most point within the exposed area of the selected building material's course is lined up with the left most vertical line of the selected building material. In this example, the building facet has multiple left-most roof facet points within the exposed area of the selected building material's course because the left-most points are part of a vertical rake line. In FIG. 12, it is shown an example of the left alignment in that the left side of roof facet 1150 is aligned with the left side of shingle 1220.

In other embodiments, for a right alignment, a building facet is moved horizontally so that the building facet's right-most point within the exposed area of the selected building material's course is lined up with the right-most vertical line of the selected building material. In yet other embodiments, for a center alignment, a building facet is moved horizontally so that the building facet's bottom-most point vertically lines up with the selected building material's center vertical line. If the building facet has multiple bottom-most points (e.g., a horizontal line for example), then the center point between the bottom-most points is lined up with the selected building material's center vertical line.

The building materials necessary for installation are identified 1070. As part of this step, the building material that is fully within the building facet is identified. For example, FIG. 12 illustrates the roofing material 1250 that lies within the roof facet 1150. Also, partially-used building materials that have right sides within the building facet, but left sides outside of the building facet. For example shingle 1230 of FIG. 12 is one such partially-use building material. Partially-used shingles can be seen as shingles with backward line hatching in roofing material pattern 1210

Each partially-used building material piece with the right side within the facet is reviewed. The aggregate area of those partially-used building material pieces that lies within the building facet is calculated. For example, in FIG. 12, shingle 1230 includes one half of one tab that lies within roof facet 1150. That one half of one tab is included in the aggregate area. The portion of the building material piece that lies outside of the building facet can be reused. Whether that portion can be reused can depend on a minimum building material size requirement for partial building material to be used. Such minimum building material size requirements can be included in the building material database 132 or be received from the building material manufacturer. If the size of the unused portion of the building material piece does not meet the minimum building material size requirement to be reused, the unused portion of the partially-used building material piece is not reused. The size requirement can be based on area, height, length, or some combination thereof.

The unused portions of the partially-used building material pieces that are determine to be reusable are then analyzed for placement to the right of the building material that lies entirely within the building facet. It should be understood that building partially-used building material can be analyzed for reuse from any side of the facet, including the left, right, top, or bottom. Those of skill in the art can appreciate that the analysis can depend on the type of building facet, the types of lines associated with the building facet to be replaced, the type of building material, the sizes of the building material or building facet, the relative sizes of the building material and building facet, some other characteristic of the building material or building facet, or some combination thereof. In some embodiments, unused portions of building materials can be determined to be used for other purposes. For example, unused portions of shingles or other roofing material can be used for installation on roof ridges.

In FIG. 12 is shown an example of reused partially-used building material. Specifically, shingle portion 1240 represents the unused portion of shingle 1230 that is determined to meet the minimum building size requirement for reuse and is determined to ideally fit in the shingle course just above the bottom shingle course. Other reused portions of partially-used shingles can be seen as cross-hatch in roofing material pattern 1210.

As part of identifying building materials necessary for installation 1070, additional building materials necessary to complete replacement of the building facet, are identified. In this case, whole building material pieces are used. Furthermore, any unused portions of those whole building material pieces can then be determined to be reused by iterating through sub-steps of identifying building materials necessary for installation.

Returning to FIG. 10, at 1080 the total quantity of building material required for installation is calculated. The installation area of each building facet as adjusted or not for building material installation is calculated and summed. In some embodiments, the waste amount, that is the unused portions of building roofing material areas, is also calculated and summed.

Figure 13:
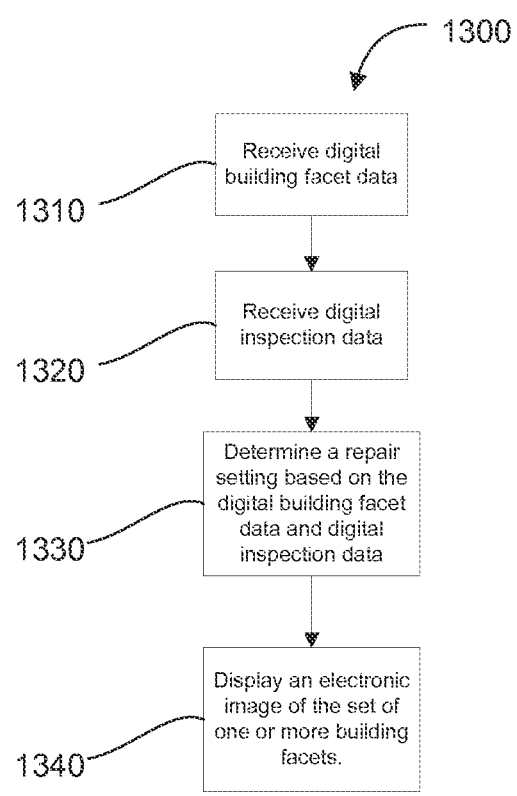
FIG. 13 shows a flowchart of a method for determining building material requirements for a repair or replacement based on building facet data, inspection data, and guideline data in accordance with an illustrative embodiment of the invention.

In FIG. 13 is shown a flowchart of a method for determining building material requirements 1300. The method includes a step for receiving digital building facet data 1310. Digital building facet data can be received from an aerial CAD data provider. In other embodiments, building facet data can be received from other CAD data or another source that can provide dimensional data concerning building facets. In yet other embodiments, building facet data can be received from a user via an input device. Digital facet data can be received from two or more sources. For example, a user can enter dimensions, line types, slope, and other building facet characteristics.

At 1320, digital inspection data is received. Digital inspection data can include data gathered at the property site from an inspector or adjuster. It can also include data related to the weather conditions that caused damage to the property. Like digital building facet data can be received from one or more different providers or sources. Digital data received at steps 1310 and 1320 can be received via a network communications interface 110 or through some other input device 115. Furthermore, data received at steps 1310 and 1320 can be stored in volatile or non-volatile memory, for example in memory 135 or in storage medium 130.

At step 1330, a repair indicator is determined based on the digital building facet data and digital inspection data or as described elsewhere herein. An electronic image of the set of one or more building facets is displayed 1340. The display can be presented on display 120 or some other output peripheral of computer 100. For example, a display can be output to a printer. Moreover, in another embodiment, a display image can be sent to another device, such as a portable device 170. The displayed image can be made in color, grayscale, black and white, or some other display scheme. Further, the display can include coding of a sort as described herein.

Figure 14:
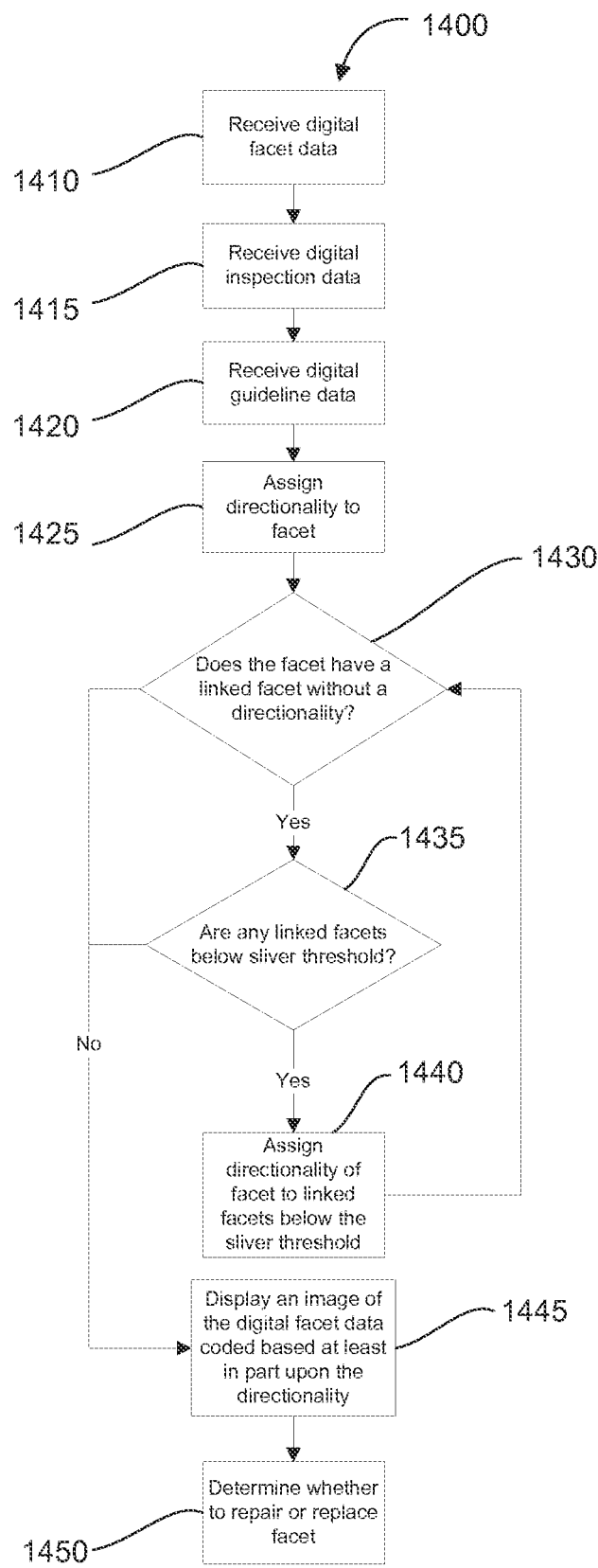
FIG. 14 shows a flowchart of a method for a repair vs. replacement analysis in accordance with an illustrative embodiment of the invention.

Referring now to FIG. 14, a flowchart of a method for a repair vs. replacement analysis 1400 is shown. Digital facet data is received 1410 and digital inspection data is received 1415. At step 1420, guideline data is received. Using the received data, directionality is assigned to a building facet 1425. In one embodiment, directionality can be assigned to every building facet and building facet line that for which building facet data is received. In other embodiments, directionality can be assigned to a subset of building facets or a subset of the building facet's associated lines. For example, directionality can be assigned to only those facets and lines for which inspection data is received or to only those facets and lines that are of interest to a user.

At step 1430, facets linked to the building facet are checked for directionality. If a linked facet lacks an assigned directionality and is determined to be below a sliver threshold 1435, the linked facet is assigned the same directionality as the building facet to which it is linked 1440. In some embodiments, iteration through every building facet and its associated lines and linked facets can be performed to ensure that directionality is properly assigned to all facets and lines so that a complete repair vs. replace decision can be made. In some embodiments, only a subset of facets and/or lines can be subject to the single analysis or analysis iteration.

An image of the digital facet data coded based at least in part upon directionality is displayed 1445 and a determination of whether to repair or replace the building facet is made 1450. As describe above, the determination of a repair, replace, or other setting can be made initially based on the received data. Subsequently, the settings can be reassigned based on other predetermined rules or other received data, such as insurance guidelines or building codes or based on user decision.

Figure 15:
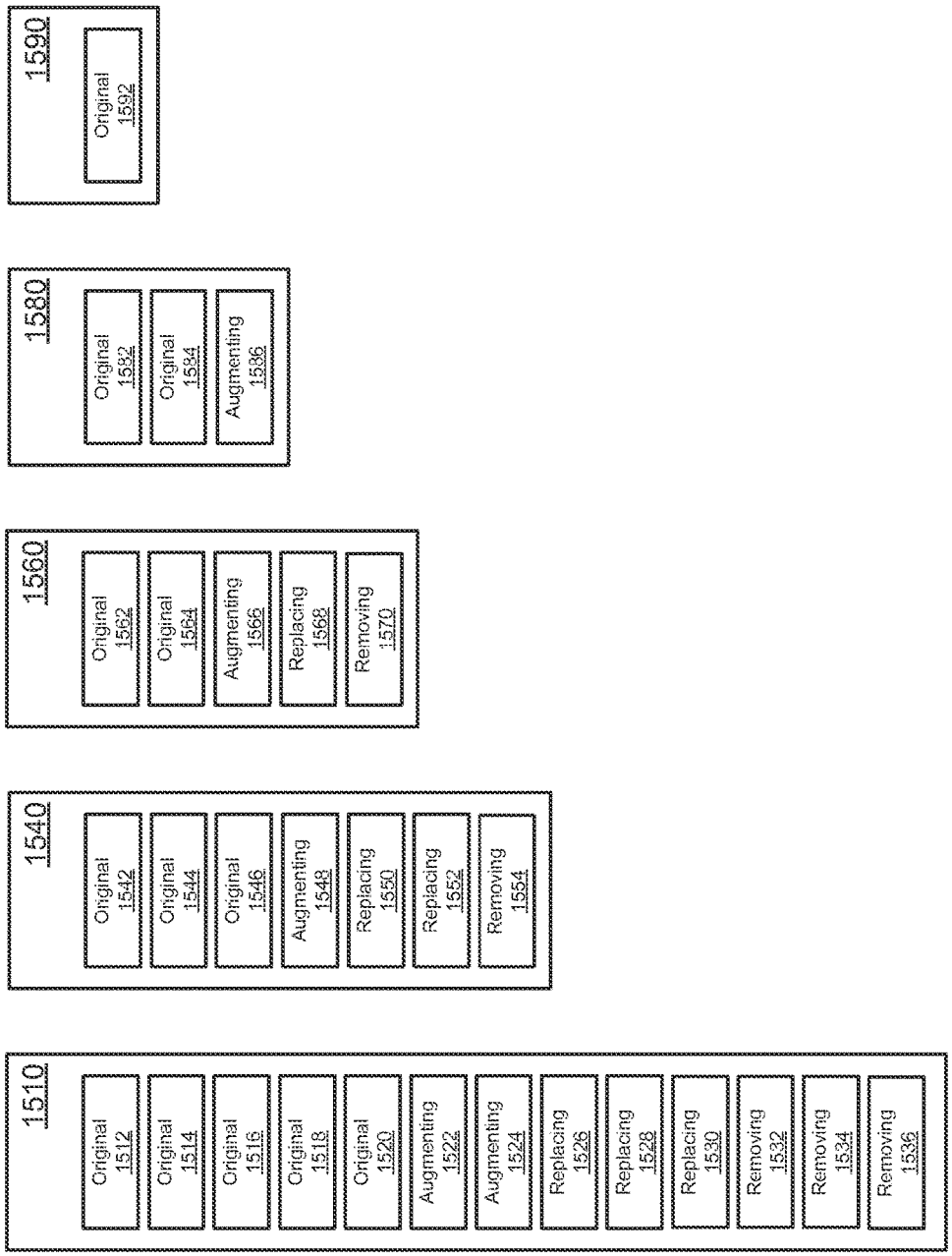
FIG. 15 shows an exemplary version of a scoping guideline item sets in accordance with illustrative embodiments of the invention.

Referring now to FIG. 15, a schematic of guideline items to be applied to a particular property is shown, including national-level scope guideline items 1510, state-level scope guideline items 1540, city-level scope guideline items 1560, zip-code-level scope guideline items 1580, and user-defined scope guideline items 1590. It is to be understood that other embodiments can use guideline items scoped at different levels. For example, other embodiments can include county-level, region-level, district-level (i.e., city district, historic district, county district, etc.), and the like. In the embodiment shown in FIG. 2, national-level guideline items 1510 includes several guideline items, including original guideline items 1512-1520, augmenting guideline items 1522-1524, replacing guideline items 1526-1530, and removing guideline items 1532-1536. Original guideline items 1512-1520 are guideline items which apply to all property repair decisions on a national level by default.

Typically, such national-level guideline items will be based on rules set by an insurance carrier or some other decision-making body. Additionally, such national-level guideline items can be based on rules set according to industry best practices or some other metric and adopted by an insurance carrier or other entity setting repair decision guidelines or rules. It is to be understood that in some embodiments, guidelines or rules can be derived from various sources. An original guideline item has a property-repair-analysis guideline or rule that, by itself, when applied to damage and inspection data, governs at least a portion of the outcome of a property repair analysis or at least a portion of the property repair analysis leading to the outcome.

In various Figures and their accompanying text, reference is made to guideline items in the scoping of guideline sets to be applied to a property repair analysis. It is to be understood that in some embodiments, guideline items are derived from raw guideline or rule data or other guideline or rule data received from a guideline or rule source. While in other embodiments, raw guideline or rule information can be scoped to determine applicable guidelines or rules to be applied in the analysis. Accordingly, in reference to various figures described, some embodiments may use raw guideline or rule data and other embodiments may user derived guideline or rule data, such as the guideline items described herein. Furthermore, the terms guideline and rule generally refer to criteria used in determining outcomes in a property repair analysis and may be used interchangeably.

In an exemplary embodiment, from the bottom up, each level undergoes item compression where items are augmented, replaced, and removed. The items resulting are then compressed with the items at the level above until the top level is reached. In the embodiment illustrated in FIG. 15, the levels start at national-level and progress down to a user-defined area. As a result of this compression, items at the more local levels will take precedence over the levels below. For example, city-level guideline items win over national-level guideline items where collisions occur. In other embodiments, other characteristics can determine precedence. For example, a different precedence order can govern items based on source. In that instance, local building codes can take precedence over insurer guidelines which can take precedence over ICC codes. In other embodiments, guideline items and thus item precedence can be based on property type, material type, rule or guideline strictness, some other characteristic, or a combination of characteristics. For example, insurer guidelines at a national level, insurer guidelines at a state level, insurer guidelines at a local level, and a county building code may all apply to a property. The insurer local guidelines can be stricter than the local building code. As a result, the insurer local guidelines can take precedence over the country building code which can take precedence over the insurer state guidelines which can take precedence over the insurer national guidelines.

In yet other embodiments, guidelines can include a time or time range which can be compared to the age of the property or the time of the event causing damage to the property. For example, a guideline item can be set to expire with another guideline item to take effect and, depending on the time of repair, analysis, time of damage-causing event, or some other time, one guideline item can take precedence over the other. In yet another embodiment, a guideline can have a time range during which it can take precedence over other, related guidelines.

Augmenting guideline items 1522-1524, replacing guideline items 1526-1530, and removing guideline items 1532-1536 similarly apply to all property repair decisions on a national level by default. However, augmenting guideline items 1522-1524, replacing guideline items 1526-1530, and removing guideline items 1532-1536 serve other purposes. Augmenting guideline items in general are secondary guideline items which serve to augment other guideline items. Replacing guideline items in general are secondary guideline items which serve to replace, under certain circumstances, other guideline items. And removing guideline items are secondary guideline items which serve to remove, or delete, other guideline items. Each type of secondary guideline items explained in further detail below.

Guideline item set 1540 includes guideline items at the state level for which guideline items 1542-1554 apply to property repair decisions for properties within a particular state. Because guideline item set 1540 is more localized than guideline item set 1510, the guideline items of guideline item set 1540 take precedence over the guideline items of guideline item set 1510. Like national-level original guideline items 1512-1520, state-level original guideline items 1542-1546 apply by default and are typically set in a manner similar to national-level original guideline items. However, because the guideline items of guidelines set 1540 are at the state level, different decision-making bodies may set them. In general, augmenting guideline item 1548, replacing guideline items 1550-1552, and removing guideline item 1554 serve similar purposes as augmenting guideline items 1522-1524, replacing guideline items 1526-1530, and removing guideline items 1532-1536, respectively. Likewise, each type of secondary state-level guideline item is explained in further detail below.

Guideline item set 1560 includes guideline items at the city level for which guideline items 1562-1570 apply to property repair decisions for properties within a particular city. Again, the guideline items 1562-1570, being at a more localized level take precedence of the guideline items of guideline item sets 1510 and 1540. Similarly, guideline item set 1580 includes guideline items at further localized level—zip code—which take precedence over the guideline items of guideline item sets 1510, 1540, and 1560. Finally, the example of FIG. 15 includes guideline item set 1590 which includes a guideline item 1592 that is user-defined and which takes precedence over all other guideline items in sets 1510, 1540, 1560, and 1580.

User-defined guideline items can be based on latitudinal and longitudinal information. For example, a user-defined guideline can be applied where a property lies within a predetermined distance from a particular latitude and longitude. In another embodiment, a user-defined guideline item can be applied when a property lies within an area defined by latitudinal and longitudinal coordinates. Such area can be triangular, rectangular, some other regular area, or some irregular area. Moreover, such an area can be larger or smaller than the areas to which other guideline item sets apply. For example, the area can be larger than a city or zip code for which another guideline item set applies. User-defined guideline items also can be based on other geographic or other types of criteria as described herein. Furthermore user-defined guideline items can simply be generally set such that no defined criterion serves as a basis for the guideline. For example, an insurance carrier may have a repair guideline or rule that applies to all types of properties regardless of the property location or any other property characteristic.

It is to be understood that the order of precedence of guideline item sets can differ. For example, user-defined guideline item sets can be placed elsewhere within the precedence order such that its guideline items take precedence over state-level guideline items, but not city-level guideline items. In other embodiments, a zip-code-level guideline item set can take precedence over a city- or state-level guideline item set. In yet other embodiments, the order of precedence can be adjusted based on the guideline item sets or guideline items to be applied, location of the property, or user preference.

It is also to be understood that in the embodiment shown in FIG. 15 the guideline item sets 1510, 1540, 1560, 1580, and 1590 can have more, fewer, or no guideline items; more, fewer, or no original guideline items; or more, fewer, or none of each type of secondary guideline item. For example, guideline item set 1540 could include no original guideline items, guideline item set 1560 could include no augmenting guideline items, or guideline item set 1580 could have more total guideline items than guideline item set 210. The guideline item sets 1510, 1540, 1560, 1580, and 1590 and their configurations are for illustration purposes only and should not be considered limiting.

Figure 16:
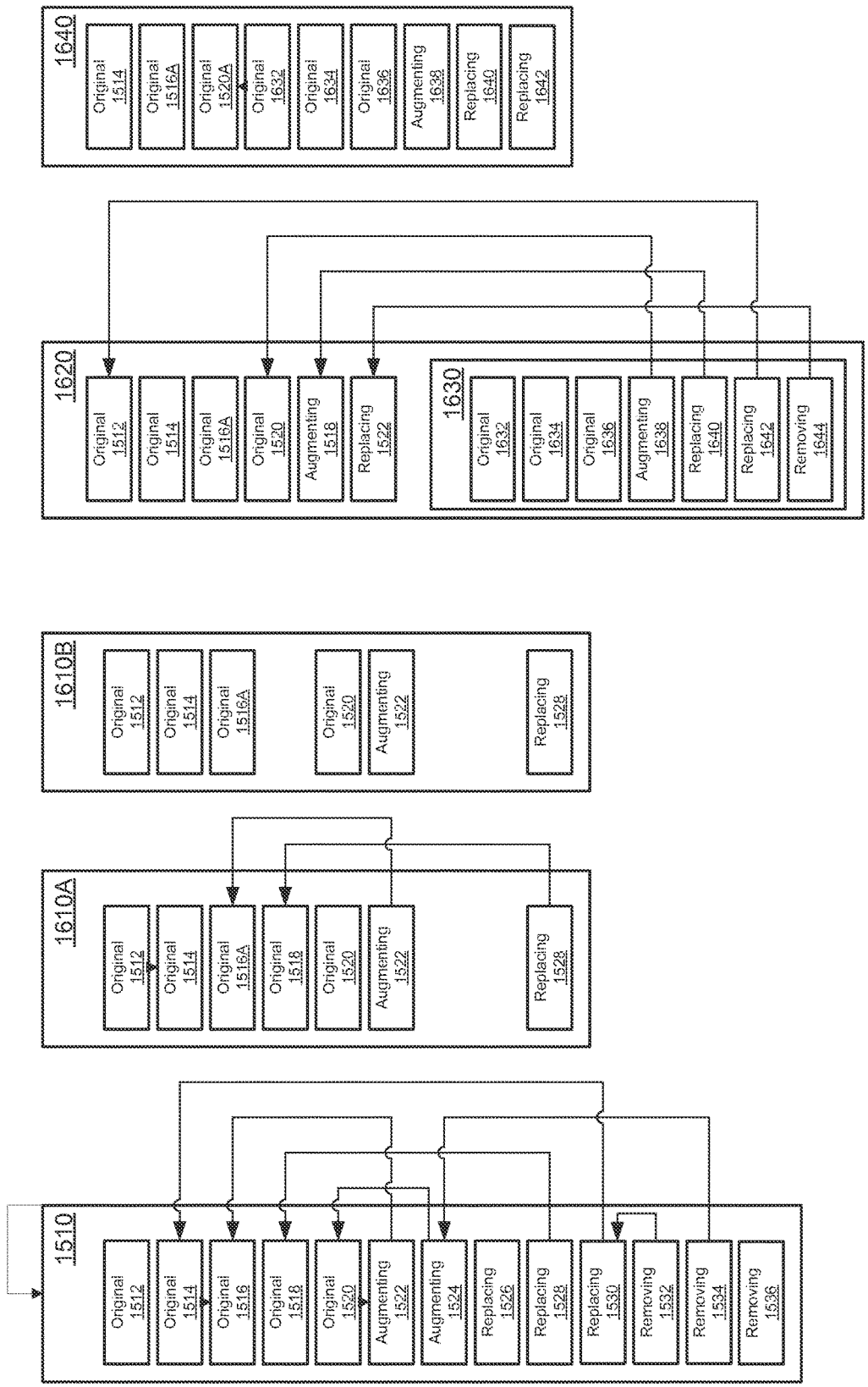
FIGS. 16-22 show exemplary versions of the compression of scoping guideline item sets in accordance with illustrative embodiments of the invention.

Referring now to FIG. 16, an example of scope compression of guideline items is shown. Specifically, national-level guideline item set 1510 includes original guideline items 1512-1520, augmenting guideline items 1522-1524, replacing guideline items 1526-1530, and removing guideline items 1532-1536. Augmenting guideline item 1522 is configured to augment original guideline item 1516. Augmenting guideline item 1524 is configured to augment original guideline item 1520. Replacing guideline item 1528 is configured to replace original guideline item 1518. Replacing guideline item 1530 is configured to replace original guideline item 1514. Removing guideline item 1532 is configured to remove replacing guideline item 1530. And removing guideline item 1534 is configured to remove augmenting guideline item 1524. In this example, the resulting intermediate guideline item sets 1610A and 1620B are derived as follows. Removing guideline item 1532 removes replacing guideline item 1530 from the guideline item set 1510. Consequently, original guideline item 1514, which replacing guideline item 1530 was configured to replace, remains unchanged and replacing guideline 1530 is removed. Removing guideline item 1534 removes augmenting guideline item 1524. Consequently, original guideline item 1520, which augmenting guideline item 1524 was configured to augment, also remains unchanged and augmenting guideline item 1524 is removed. Neither replacing guideline item 1526 nor removing guideline item 1536 have corresponding guideline items to affect and therefore are ignored. The intermediate result is guideline item set 1610A, now missing augmenting item 1524, replacing guideline items 1526, 1530, and removing guideline item 1536 as well as removing guideline items 1532-1534, which have been compressed. Augmenting guideline item 1522 is used to augment original guideline item 1516. As a result, guideline item 1516A includes the original guideline item 1516 with augmented parameters from guideline item 1522. Lastly, replacing guideline item 1528 replaces original guideline item 1518. The intermediate result is guideline item set 1610B, now missing original guideline item 1518.

Guideline item set 1620 includes the resulting national-level guideline item set 1610B and state-level guideline item set 1630 in which augmenting guideline item 1638 is configured to augment original guideline item 1514; replacing guideline item 1640 is configured to replace augmenting guideline item 1518, replacing guideline item 1642 is configured to replace original guideline item 1512, and removing guideline item 1644 is configured to remove replacing guideline item 1522. Guideline item set 1640 shows the resulting guideline item set after the national-level and state-level guideline items are compressed. National-level original guideline item 1512 has been replaced by state-level replacing guideline item 1642. National-level original guideline item 1516A remains unchanged. National-level original guideline item 1520 has been augmented by state-level augmenting guideline item 1638 to create guideline item 1520A. State-level original guideline items 1632-1636 are also included in guideline item set 1620. In the example shown, state-level original guideline items 1632-1636 are guideline items that apply at the state level and do not have corresponding national-level guideline items for repair analysis and decision. National-level augmenting guideline item 1518 has been replaced by state-level replacement guideline item 1640. In the embodiment shown in FIG. 16, guideline item set 1640 includes the guideline items that would apply to the property for which the property repair analysis is done.

Figure 17:
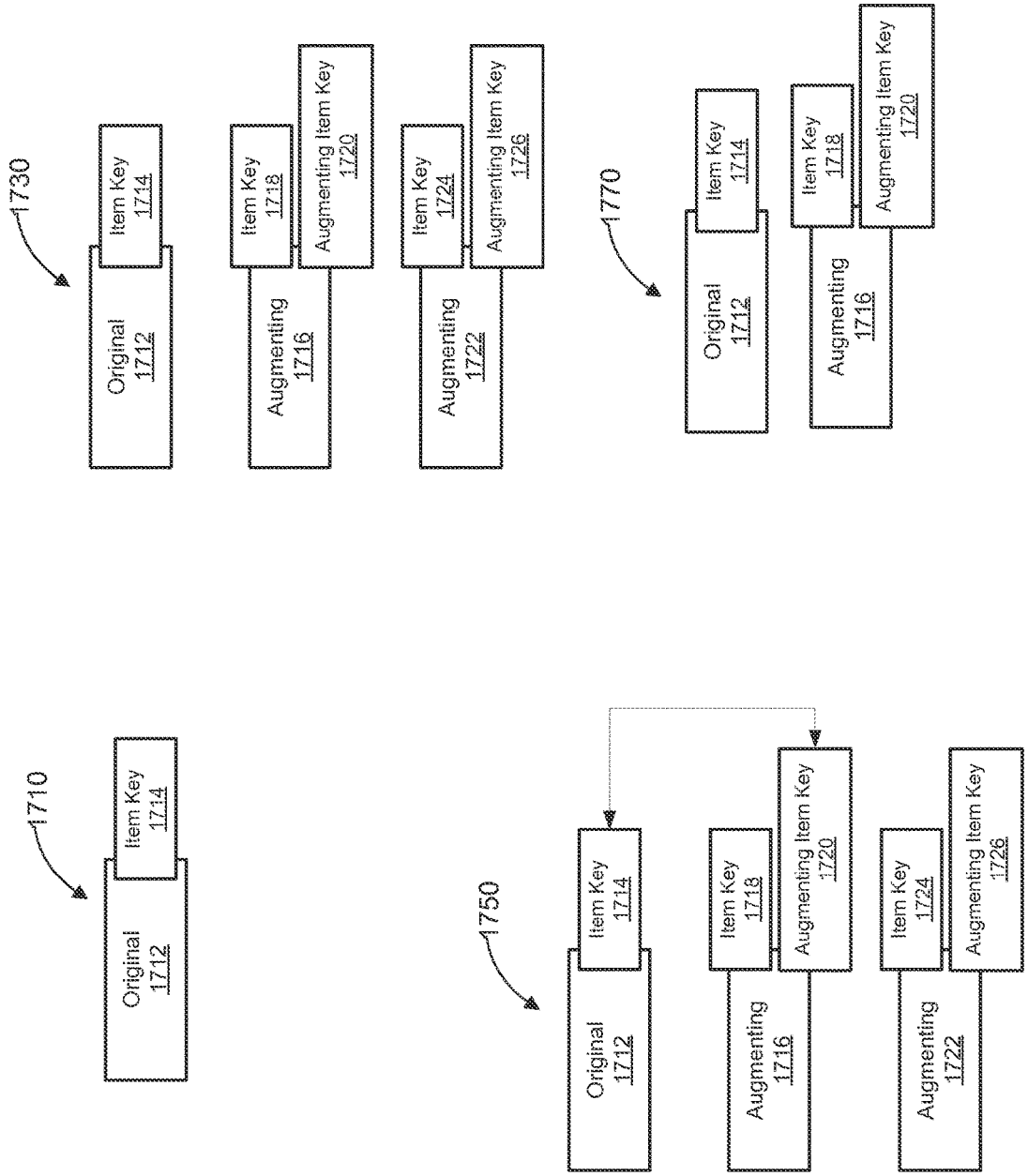

Referring now to FIG. 17, an embodiment of basic item augmentation is shown. At stage 1710 is shown original guideline item 1712 which includes identifying item key 1714. In the embodiment shown, original guideline item 1712 and other guideline items are stored as records in a guideline database 134 as shown in FIG. 1A. At stage 1730, augmenting guideline items 1716 and 1722 with their respective item keys 1718 and 1724 and augmenting item keys 1720 and 1726 are placed in a list of scope guideline items within a guideline item set similar to guideline item set 1510 shown in FIG. 15, guideline item set 1620 shown in FIG. 16, or some other guideline item set. At stage 1750, the scoping engine analyzes the item keys and augmenting item keys for the guideline items and finds that augmenting item key 1720 matches item key 1714. Some secondary guideline items can lack matching items to replace, remove, or augment.

Depicted at stage 1750 is augmenting guideline item 1722 which includes augmenting item key 1726 which does not match another guideline item. In this case, augmenting guideline item 1722 will be removed from the guideline item set, as shown at stage 1770. In the embodiment shown, the resulting guideline item set includes original guideline item 1712 and augmenting guideline item 1716 which includes or references guideline logic that augments the guideline logic of original guideline item 1712. Although FIG. 4 shows an embodiment in which an original guideline item is augmented, it should be understood that any type of guideline item, including replacing, removing, or augmenting guideline items can also be augmented.

Figure 18:
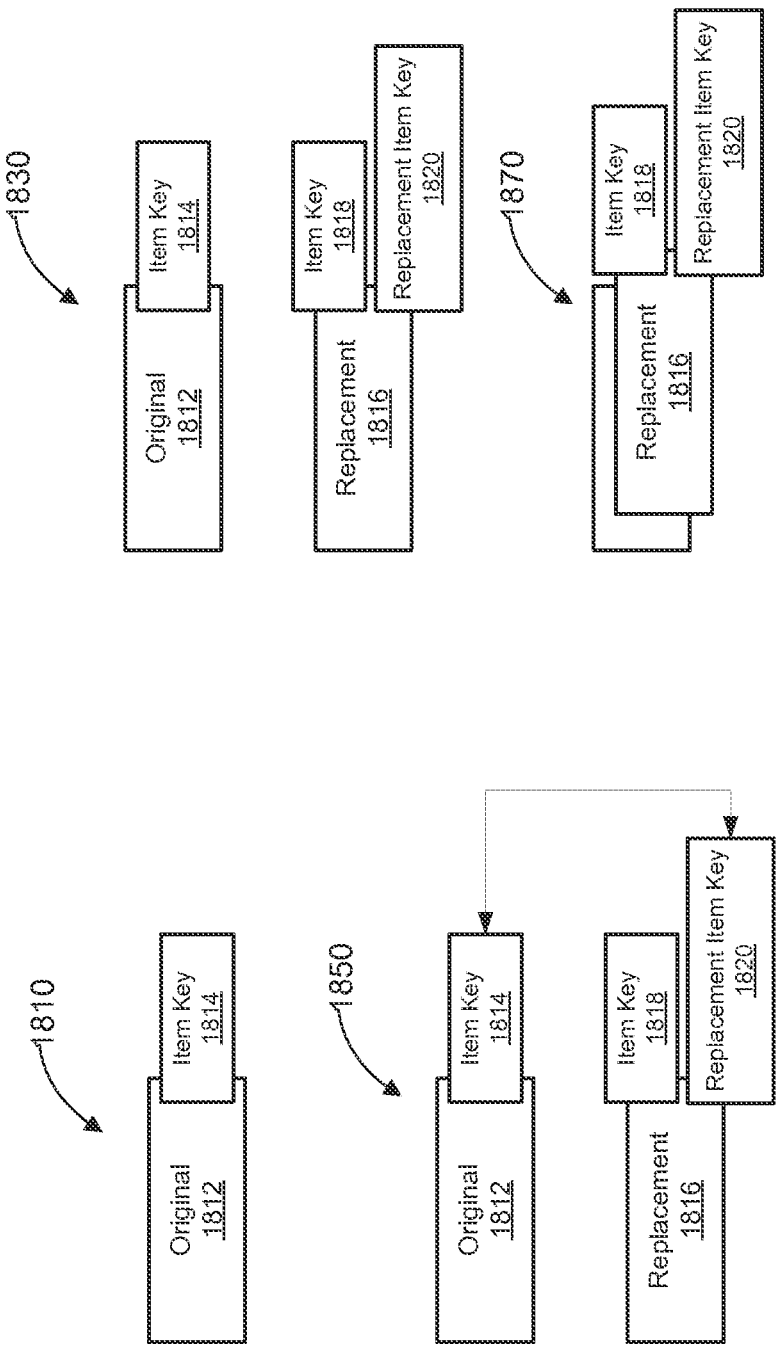

In FIG. 18 is shown an embodiment of basic guideline item augmentation. At stage 1810 is shown original guideline item 1812 which includes item key 1814. In the embodiment shown, original guideline item 1812 and other guideline items are stored as records in a database, similar to database 132 shown in FIG. 1A. Item key 1814 is used as a record key to identify the record for original guideline item 1812. At stage 1810, original guideline item 1812 is placed in the list of guideline items for a guideline item set.

At stage 1830 replacement guideline item 1816 is placed in the list of scope guideline items similar to stage 1730 from FIG. 4 described above. Replacement guideline item 1816 includes item key 1818 and replacement item key 1820. At stage 1850 the scoping engine analyzes the keys within each guideline item. In the embodiment shown, the scoping engine will find that replacement item key 1820 matches item key 1814 indicating that replacement item guideline 1816 should replace original guideline item 1812. At stage 1870 is shown the resulting guideline—that original guideline item 1812 is replaced by replacement guideline item 1816. In this embodiment, the scoping engine compares replacement item key 1820 with the item keys that identify other guideline items, including item key 1814. In this embodiment, the scoping engine finds a match between item key 1814 and replacement item key 1820.

Figure 19:
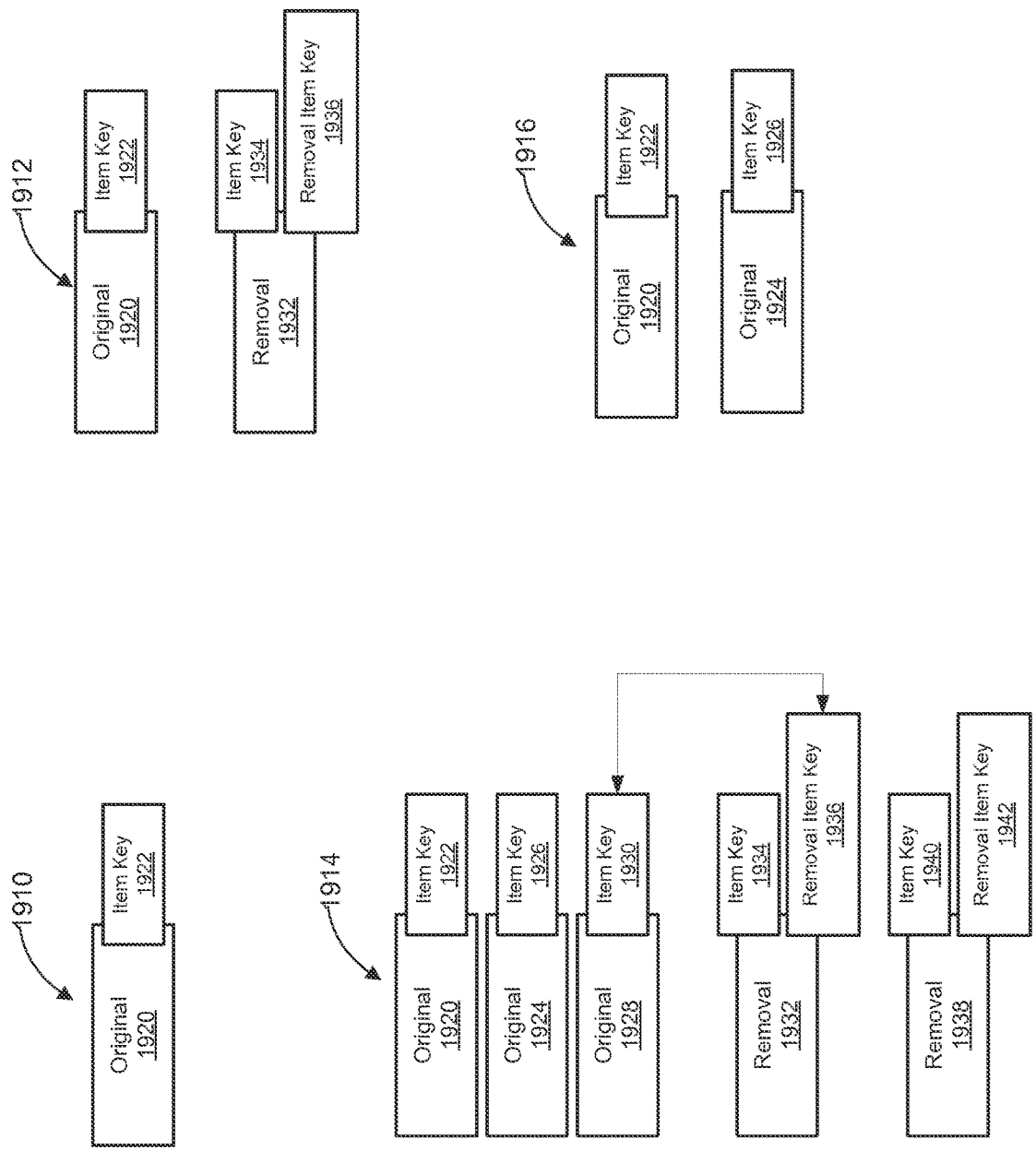

Referring now to FIG. 19, an embodiment of basic item removal is shown. At stage 1910, original guideline item 1920 is placed in a scoping guideline item set. Original guideline item 1920 has an identifying item key 1922. At stage 1912, removal guideline item 1932 is placed in the same scoping guideline item set. Removal guideline item 1932 includes an identifying item key 1934 and removal item key 1934. The scoping engine will find other guideline items with item keys that match removal item key 1934 to determine whether those other guideline items should be removed from the guideline item set.

At stage 1914, other original guideline items 1924 and 1928 are added to the same scope guideline item set. Original guideline items 1924 and 1928 include identifying item keys 1926 and 1930, respectively. Also added to the same scope guideline item set is removal guideline item 1938 which includes identifying item key 1940 and removal item key 1942. The scoping engine finds guideline items that have item keys that match removal item keys 1936 and 1942 and that should be removed. In this example, item key 1930 matches removal item key 1936 and no item key matches removal item key 1942. As a result, original guideline item 1928 will be removed, removal guideline item 1932 will be removed because it will no longer serve a purpose after having caused the removal of original guideline item 1928, and removal guideline item 1938 will be removed because it also will no longer serve a purpose. Stage 1916 illustrates the resulting guideline items: original guideline items 1920 and 1924. Also, if any of the removal guideline items had removal item keys for which no identifying item key was found, those non-matching removal guideline items would be removed from the scoping guideline items set.

Figure 20:
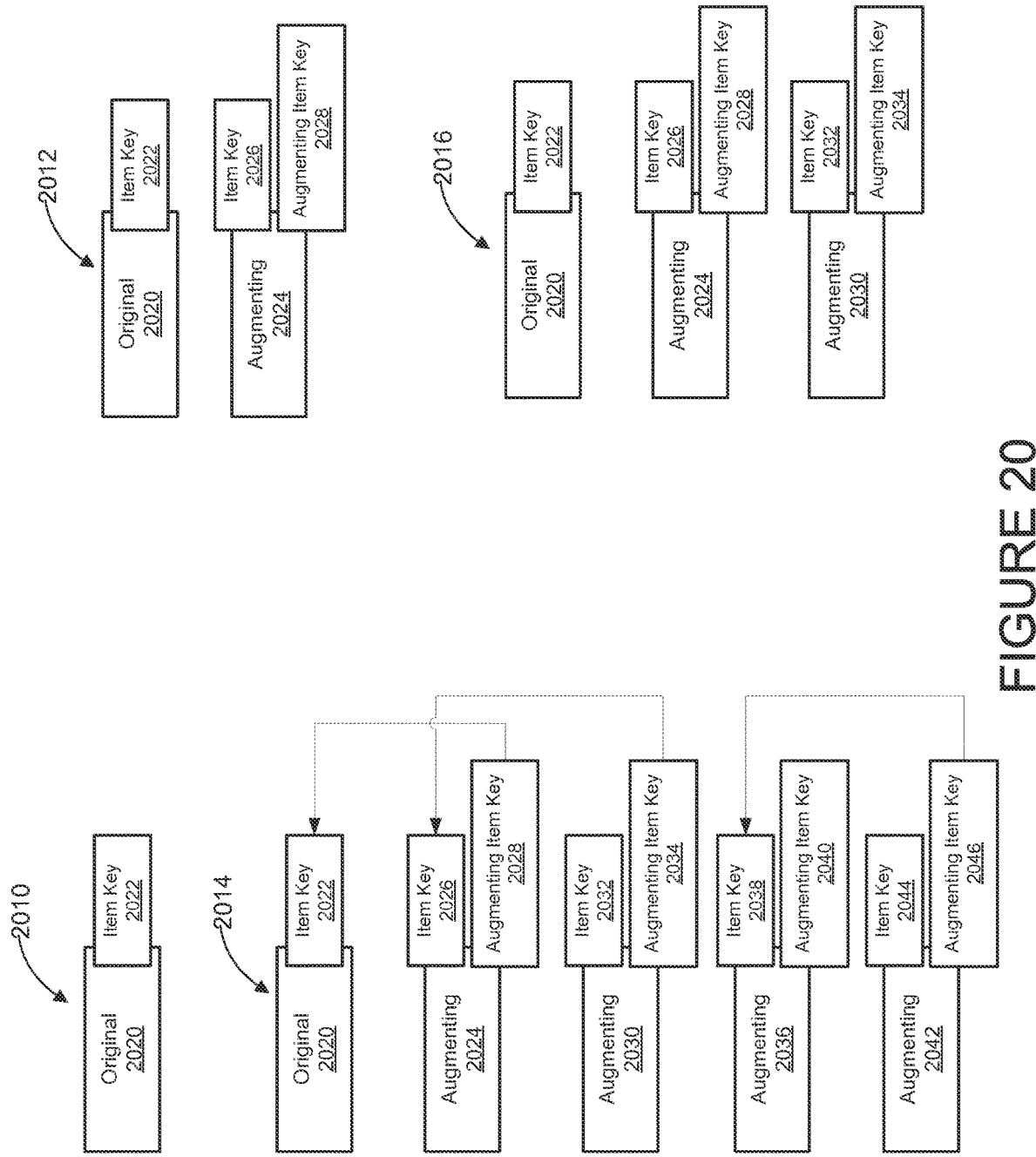

In FIG. 20 is shown an embodiment of chained item augmentation. At stage 2010 original guideline item 2020 with identifying item key 2022 is placed in a scoping guideline item set. At stage 2012, augmenting guideline item 2024 with identifying item key 2026 and augmenting item key 2028 is placed in the same scoping guideline item set.

At stage 2014, additional augmenting guideline items are included in the same scoping guideline item set. Augmenting guideline item 2030 with identifying item key 2032 and augmenting item key 2034, augmenting guideline item 2036 with identifying item key 2038 and augmenting item key 2040, and augmenting guideline item 2042 with identifying item key 2044 and augmenting item key 2046 are included in the same scoping guideline item set. The scoping engine compares augmenting item keys 2028, 2034, 2040, and 2046 with item keys 2022, 2026, 2032, 2038, and 2044 of other guideline items. In the embodiment shown, the scoping engine finds that augmenting item key 2028 matches item key 2022, augmenting item key 2034 matches item key 2026, and augmenting item key 2046 matches item key 2038. The scoping engine finds that each of augmenting guideline items 2024 and 2030 augment guideline items that will be used in the property repair analysis. On the other hand, the scoping engine finds that neither augmenting guideline items 2036 or 2042 augment guideline items that will be used. Specifically, no guideline item key was found that matched augmenting item key 2040 of augmenting guideline item 2036. Therefore, augmenting guideline item 2036 is not needed and will be removed. Augmenting item key 2046 was found to match item key 2038 of augmenting guideline item 2036 which is not needed. As a result, the guideline logic of augmenting guideline item 2042, if kept, would only augment guideline logic of an unneeded guideline item. Therefore, augmenting guideline item 2042 is similarly unneeded and will be removed.

At stage 2016, the resulting guideline items include original guideline item 2020, augmenting guideline item 2024, and augmenting guideline item 2030. In the embodiment shown, each of guideline items 2020, 2024, and 2030 remain so that each can be applied to the property repair analysis. Augmenting guideline item 2030 augments the guideline logic of augmenting guideline item 2024 which, in turn, augments the guideline logic of original guideline item 2020.

Figure 21:
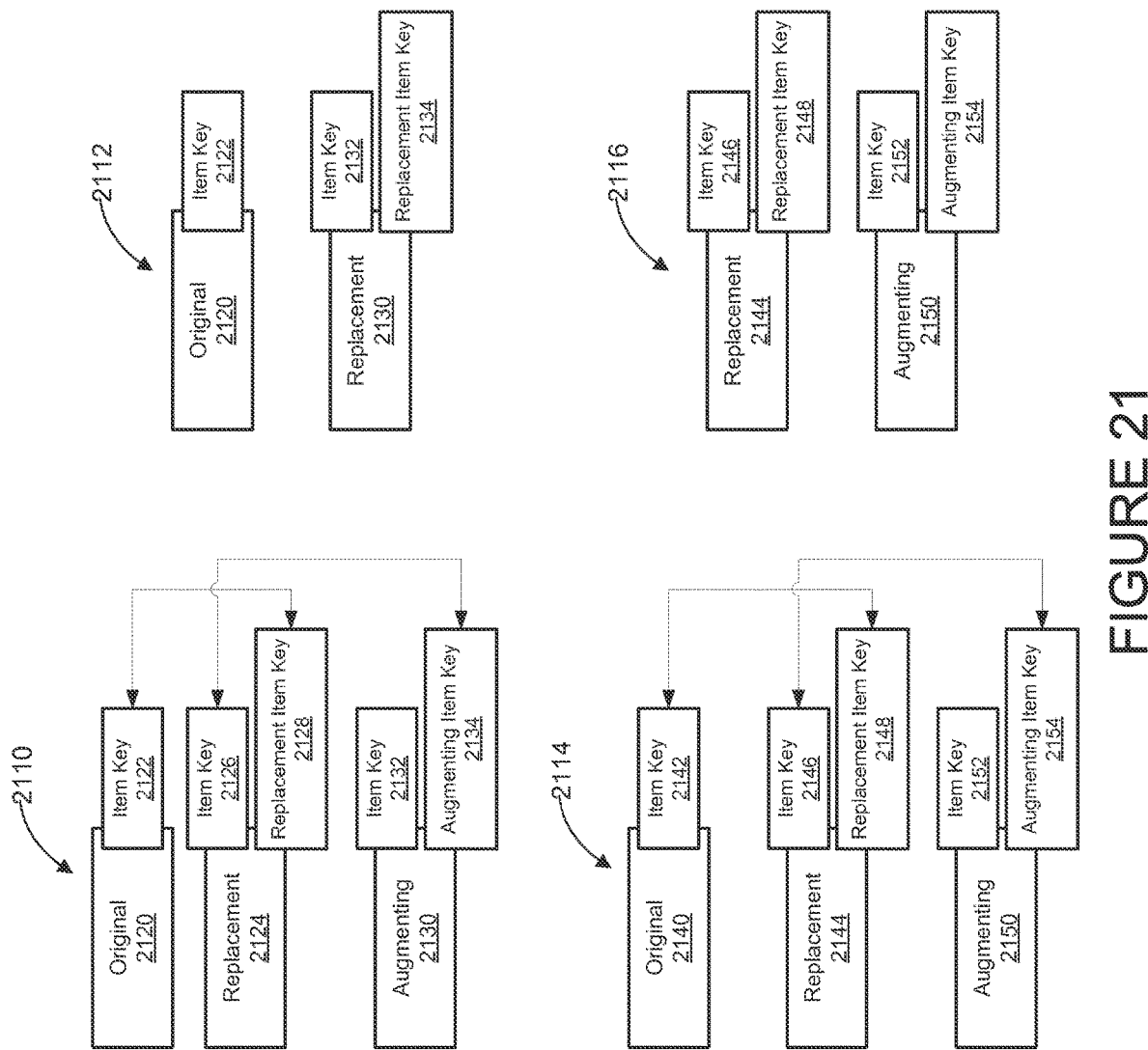

In FIG. 21 is shown an embodiment of combined item augmentation and item replacement. At stage 2110 original guideline item 2120 with identifying item key 2122 is placed in a scoping guideline item set. Replacement guideline item 2124, with identifying item key 2126 and replacement item key 2128, and augmenting guideline item 2130, with identifying item key 2132 and augmenting item key 2134, are also placed in the scoping guideline item set. In this embodiment, augmenting guideline item 2124 augments the guideline logic of original guideline item 2120. Then, replacement guideline item 2130 replaces augmenting guideline item 2130. At stage 2112 is shown the resulting scoping guideline item set containing original guideline item 2120 and replacement guideline item 2130.

Also shown in FIG. 21 is an embodiment in which an original guideline item is replaced by a replacement guideline item and then the replacement guideline item is augmented with an augmenting guideline item. At stage 2114, original guideline item 2140 with identifying item key 2142 is replaced by replacement guideline item 2144 with identifying item key 2146 and replacement item key 2148. Again, replacement item key 2148 matches identifying item key 2142. Then, augmenting guideline item 2150 with identifying item key 2152 and augmenting item key 2154 augments replacement guideline item 2144. Here, augmenting item key 2154 matches identifying item key 2146. At stage 2116 is shown the resulting scoping guideline item set which includes replacement guideline item 2144 and augmenting guideline item 2150.

Figure 22:
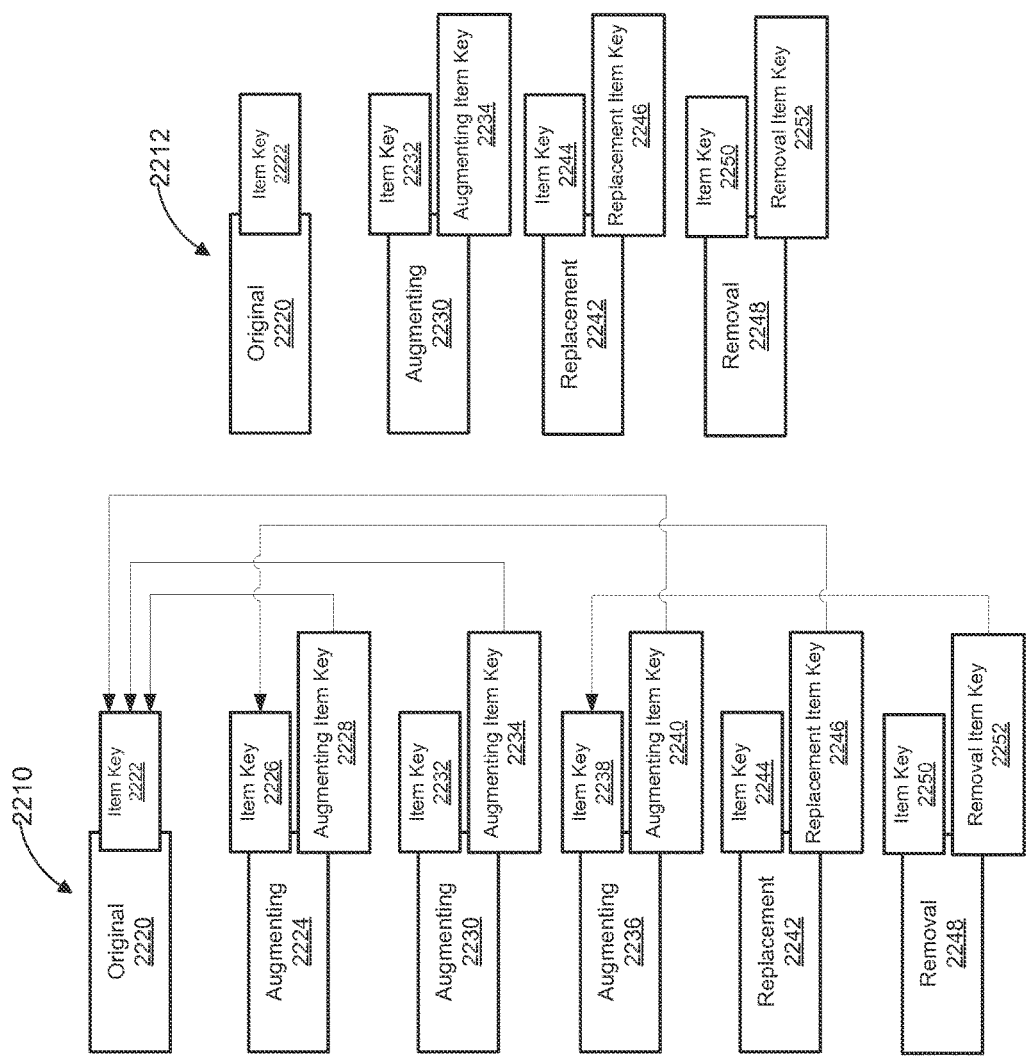

In FIG. 22 is shown an embodiment of advanced chaining. In this example, removal guideline item 2248 with identifying item key 2250 and removal item key 2252 removes augmenting item 2236 with identifying item key 2238 and augmenting item key 2240 when the scoping engines finds that removal item key 2252 matches identifying item key 2238. Here, the scoping engine also finds that augmenting item key 2240 also matches identifying item key 2222 of original guideline item 2220. However, in the embodiment shown, the removal guideline item 2248 takes precedence over augmenting guideline item 2236. Therefore, augmenting guideline item 2236 is not used to augment original guideline item 2220. In other embodiments, augmenting guideline item 2236 could be used to augment original guideline item 2220 before the scoping guideline items engine applies removal guideline item 2248 to remove augmenting guideline item 2236.

Replacement guideline item 2242 with identifying item key 2244 and replacement item key 2246 is used to replace augmenting guideline item 2224 with identifying item key 2226 and augmenting item key 2228. Replacement item key 2246 matches identifying item key 2226. Augmenting guideline item 2224 would have been used to augment original guideline item 2220 because the scoping engine would find that augmenting item key 2228 matches identifying item key 2222. However, replacement guideline item 2242 takes precedence. In the embodiment shown, replacement guideline item 2242 is used to augment original guideline item 2220 because it replaced an augmenting guideline item, augmenting guideline item 2224 which would have augmented original guideline item 2220. In other words, replacement guideline item 2242 took the place of augmenting guideline item 2224 to augment original guideline item 2220. Lastly, augmenting guideline item 2230 with identifying item key 2232 and augmenting item key 2234 is used to augment original guideline item 2220 because the scoping engine finds that augmenting item key 2234 matches identifying item key 2222. Here, no other guideline item has a removal, replacement, or augmenting item key that matches identifying item key 2232. The resulting scoping set at stage 2212 shows that original guideline item 920, augmenting guideline item 2230, replacement guideline item 2242, and removal guideline item 2248 remain.

Figure 23:
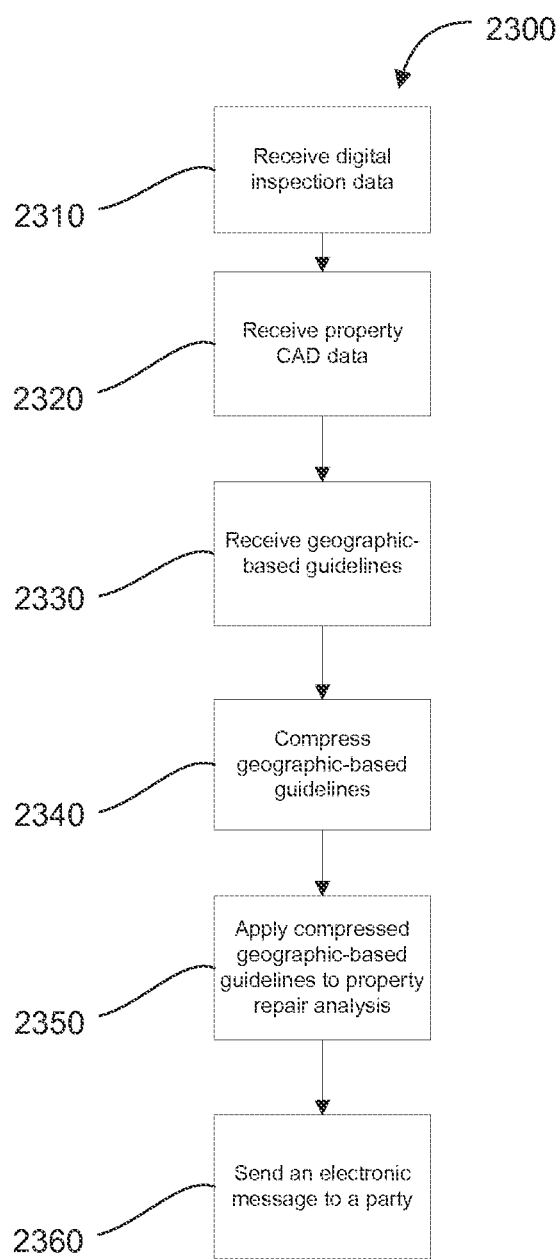
FIG. 23 shows a flowchart of a method for applying digital inspection data, CAD data, and compressed guidelines to a property repair analysis in accordance with illustrative embodiments of the invention

Referring now to FIGS. 23-26, it is to be understood they are not limiting and many of the embodiments illustrated in FIGS. 23-26, can include more or fewer steps and steps illustrated in one embodiment can be included in another embodiment. Referring now specifically to FIG. 23, a method for reconciling property repair analysis guidelines 2300 in accordance with a preferred embodiment is shown. In some embodiments, the digital inspection data and geographic-based guidelines can be received from the same source. In other embodiments, the digital inspection data and geographic-based guidelines can be received from different sources. Further, each of the digital inspection data and the geographic-based guideline data can be received from one or more different sources. Although the embodiment shown in FIG. 10 illustrates a particular order for blocks 2310-2340, the order illustrated in the flowchart is by way of example only and the blocks and/or steps within blocks do not have to be executed in a particular order or at a particular time. In some embodiments, blocks 2310-2340 or a subset thereof can be performed iteratively to include additional digital inspection data and/or guidelines, to perform additional reconciliation, or to send additional messages.

In a preferred embodiment, digital inspection data is received 2310. Digital inspection data can be received 2310 from computing devices at the property site, including portable inspection devices 170 or via another computing device as described above in relation to FIG. 1B. Further, digital inspection data can be received 2310 from multiple sources. For example, digital inspection data can come from a property stakeholder (i.e., a person or entity having an interest in the property), property inspector, or any person or entity that has information about the property. Such information can be consolidated before the digital inspection data is received 2310 or after. Digital inspection data can be stored in memory 135 or storage medium 130.

Digital inspection data can include various forms of information. In some embodiments, digital inspection data can include onsite photos of the property which can be processed so that building facets, materials, damage, and other information conveyed can be recognized. Information from photo recognition can become input into the property repair analysis. Such photo recognition can determine the shape, color pattern, style, some other characteristic, or a combination thereof to determine the material required for the repair or replacement of a particular building facet. For example, particular shingles from a specific manufacture have a particular color, shape, style, and texture pattern. The color, relative or absolute shape, size, position, and dimension of particular aspects of the material, dimension of the material piece, pattern, other characteristics, or a combination of characteristics can be compared to shingle data from a database.

In addition, three-dimensional aspects of the building material can be captured and compared. For example, some clay roofing consists of convex tiles and the curvature of the tile can be captured and used in the comparison. In one embodiment, the onsite photo of a shingle is pixilated, the pixels decomposed, and the pixel pattern is compared against a database of shingle pattern data to determine the proper manufacturer. In other embodiments, details captured from the onsite photo or from other information gathered onsite can be converted to numeric information for comparison. The photo recognition can also be applied to other building materials, including windows, siding, ventilation systems, gutters, and the like. This analysis can be performed as part of the normal property repair analysis or as a separate process. Moreover, building material recognition can be performed on other sources of data, including CAD data that includes building material characteristic image data. Further, a separate system can be used to perform this analysis apart from the property repair analysis, as part of a cost estimation process, or as a method simply to determine the source of building material. Data from the onsite photo, including the photo and any derived data, and the building material information to which it is compared can be stored in building materials database 132.

Digital inspection data can also include geocoding information related to the property. For example, geocoding data can include latitude and longitude or other coordinate data of the property. In some embodiments, such coordinate data can then be converted into zip code, city, county, district, state, and other geocoding information. Geocoding information as part of the digital inspection data can also include address, zip code, district, city, state, and other types of information related to the location of the property. Likewise, such geocoding information can be converted to latitude and longitude or other coordinate data. Moreover, geocoding information can include information about the location of the property, such as altitude, proximity to geographic entities, such as bodies of water, fault lines, and other geographic features relevant to the location of the property. In some embodiments, geocoding information related to the property can be received from another source. For example, geocoding information can be received with property CAD data from an aerial CAD provider or other CAD source. In yet other embodiments, geocoding information related to the property can be received as a separate step from another or similar source. For example, an insurer can maintain geocoding information related to the property.

Referring still to FIG. 23, digital inspection data can be received 2310 directly from an insurance adjuster's portable inspection device 170 or some other computing device or, as described above, through from another, separate computing device and stored in guideline database 134 or, in other embodiments, in memory 135, storage device 130, or similar storage. Further, as mentioned above, digital inspection data can be received from multiple computing devices. For example, some digital inspection data can be received from an insurance adjuster's handheld computer.

Property CAD data is received 2320 and can be stored in memory 135 or storage device 130. In a preferred embodiment, the CAD data received is aerial CAD data of the property. The systems, apparatuses, and methods for receiving CAD are further described in nonprovisional application Ser. No. 13/336,559, entitled "Method and System for Roof Analysis."

Geographic-based guidelines are received 2330 and can be stored in memory 135 or storage device 130. In one embodiment, the scoping engine receives rule information from various sources according to the property location. It then can generate standardized guidelines from those rules and tag them with their source (e.g., state, city, national, etc.). As described above, geographic-based guidelines can include guidelines for any geographic location. For example, guidelines can be national-level, state-level, county-level, city-level, district-level, region-level, zip-code-level, area-code-level, zoning-code-level, and the like. Geographic locations can be based on geographic regions (e.g., Pacific Northwest Region, Piedmont Region, etc.) or political regions (e.g., city, zoning area, etc.) Further, geographic locations can be based on other location characteristics such as altitude, proximity to floodplains, frequency of hail, tornados or other storm events, and the like. Geographic locations can also be combinations of the foregoing (e.g., Virginia Piedmont Region areas within two miles of a floodplain, San Mateo County within one and a half miles of the San Andreas Fault, etc.). Those of skill in the art can appreciate the spectrum of geographic locations and the combinations of geographic locations that can be useful as a basis for property repair analysis guidelines.

In one embodiment, geographic-based guidelines can be received 2330 from multiple sources. For example, guideline data can be received from an insurance carrier database, a local government that maintains building codes, an international building code database, a database of guidelines for the repair or replacement of particular building material, and the like. It is to be understood that geographic-based guidelines can be received 2330 on a regular basis at intervals, when guideline data is updated, or when a property repair analysis is performed and guideline data is required.

The geographic-based are compressed 2340. In various embodiments, guidelines can be compressed as discussed above in connection with FIGS. 15-22. The compressed geographic-based guidelines are applied to a property repair analysis 2350. In one embodiment, the system renders repair and replace decisions to a property based on the digital inspection data, property CAD data, and the geographic-based guidelines. In another embodiment, the geographic-based guidelines can be executed against property CAD data alone or the digital inspection data alone. For example, if digital inspection data provides information that does not relate to any of the property CAD data, the property repair analysis may take only the digital inspection data and applicable guidelines into account. If property CAD data provides information that does not relate to any of the digital inspection data, the property repair analysis may take only the property CAD data and the applicable guidelines into account. Systems and methods for performing property repair analysis are more fully discussed in nonprovisional application Ser. No. 13/336,559, entitled "Method and System for Roof Analysis," which is incorporated herein in its entirety.

As part of the property repair analysis, repair or replacement decisions can be based on a peril specific variable. A peril specific variable enables a likelihood of damage factor to be set that a repair or a replacement decision would be triggered by the peril. It can be based on the building facet, the building facet material, the damage-causing event, and other factors relevant to indicating whether a building facet might have to be repaired or replaced. For example, a steel exhaust vent would rarely be damaged by hail. Accordingly, the "replace steel exhaust vent" variable would be set to low when the damage-causing event was a hail storm, the insurance claim was for hail damage, or both. The material type that goes into the determination can be obtained, for example, from the photo recognition as described above, from other digital inspection data, CAD data, and the like. During or after the property repair analysis, the scope of repair and replace items can be analyzed based on one or more likelihood of damage factors that each item has for the peril specific variable. As part of the process, if items are tagged with repair or replace because of their directionality and the damage type, for example, and those items are tagged with low likelihood of damage factors because, for example their material and the damage type or damage causing event, the claim can be flagged for review. This may prevent the unnecessary approval of a repair or replacement for the building or a subset of building facets.

An electronic message is sent to a party 2360. In one embodiment, a system user can be presented with an indicator that a building facet is to be replaced or repaired based on the compressed geographic-based guidelines applied to the property repair analysis 2350. For example, a building facet can be coded in a CAD image of the property as described in nonprovisional application Ser. No. 13/336,559, entitled "Method and System for Roof Analysis." In another embodiment, an electronic message can be sent to an insurer regarding the repair analysis. For example, the insurer can be provided with details about the material required (e.g., type, amount, manufacturer, supplier, etc.), the estimated material waste, an estimated cost of repair or replacement (e.g., material cost, supplier prices, contractor estimates, etc.), information about the guidelines applied, information about the property CAD data, information about the digital inspection data, and the like.

In yet another embodiment, the insured, the insurance adjuster, contractor, property inspector, governmental agency, or other stakeholder can be provided with the same or similar information. For example, property owners can receive information about the extent of property repair cost, governmental agencies can receive information about multiple properties having been analyzed, and property inspectors can receive information property repair and replacement that must be inspected. Those of skill in the art can appreciate that the information aggregated and generated can be presented in varying levels of detail to multiple stakeholders.

The electronic message can include XML, CSV, or other types of flat-file data or other types of common or proprietary formatted information for input into other systems. For example, insurance adjusters may accept the sent message as an XML file to be displayed as a form on the portable inspection device 170. In another embodiment, the message can be sent as a pre-formatted PDF file to an insurance carrier for storage in the insurance carrier's records system or to a property owner for the owner's personal records. Those of skill in the art can appreciate that the generated information related to the property repair analysis can be useful to a number of stakeholders, each with its own requirements and uses for the information. Accordingly, the information related to the outcome of the property repair analysis can be formatted in a number of different ways for transmission to a number of different stakeholders for a number of different uses.

Figure 24:
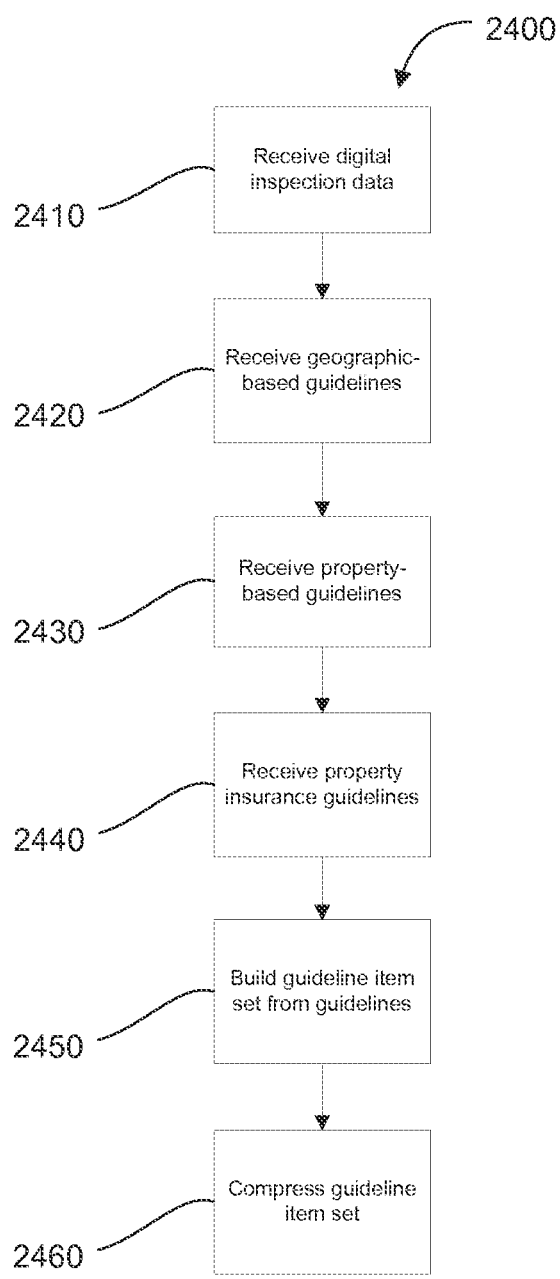
FIG. 24 shows a flowchart of a method for compressing guidelines in accordance with illustrative embodiments of the invention.

Referring now to FIG. 24, illustrated is an embodiment of a method for determining the guidelines to be applied to a property repair analysis 2400. Digital inspection data is received 2410 as described above. Also, geographic-based guidelines are received 2420 as described above. Further, property-based guidelines are received 2430, similar to the geographic-based guidelines. In a preferred embodiment, property-based guidelines can be guidelines that govern the repair or replacement of particular types of property (e.g., commercial buildings, residential buildings, residential or commercial out-buildings, schools, non-habitable structures, and the like), particular types of building materials (e.g., fiberglass roofing, steel roofing, clay roofing, aluminum siding, wood siding, and the like), and other types of property characteristics.

Property insurance guidelines can be received 2440, similar to the geographic-based guidelines. Such guidelines can be based on the type of insurance coverage the property owner or other stakeholder has for the property to be analyzed. For example, the property owner may have a specific type of coverage that allows for full replacement if damage estimates rise above a predetermined limit. The property owner can have a specific type of coverage that precludes or requires particular types of repairs. Those of skill in the art can appreciate that insurance policies and insurers offer different levels of coverage that determine the results of a property repair analysis. A guideline item set is built from the guidelines received 2450 as described above in connection to FIGS. 15-22 and the guideline item set is compressed 2460 as described above in connection with FIGS. 15-22.

Figure 25:
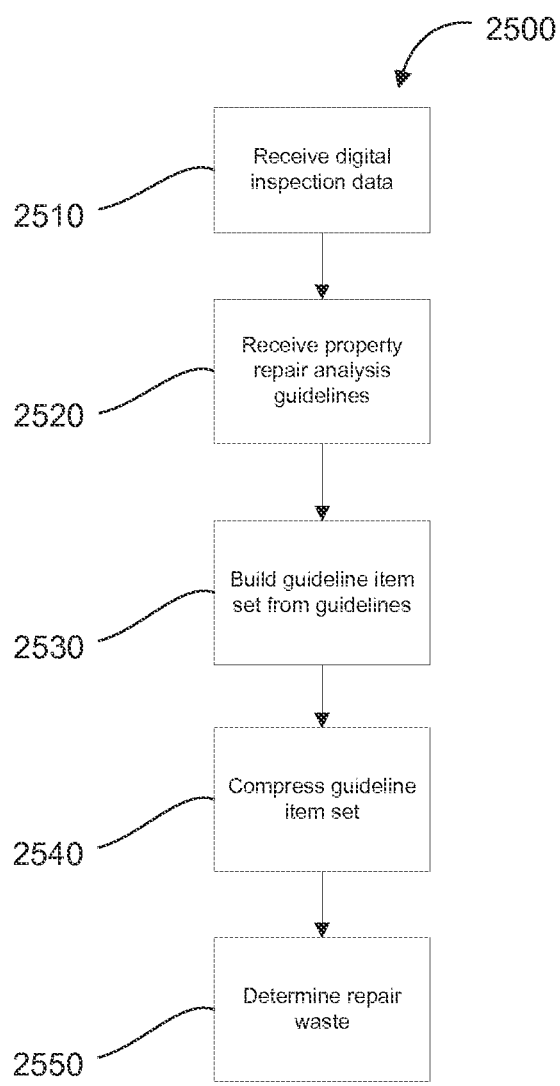
FIG. 25 shows a flowchart of a method for determining repair waste requirements using compressed guidelines in accordance with illustrative embodiments of the invention.

Referring now to FIG. 25, an embodiment of a method to determine property repair waste 2500 is shown. Digital inspection data is received 2510 and property repair analysis guidelines are received 2520 as described above, property repair analysis guidelines generally referring to guidelines of any of the types described above. The guideline item set is built from the guidelines 2530 and the guidelines are compressed 2540.

The waste from the property repair as determined from the digital inspection data and the compressed guidelines is determined 2550. In a preferred embodiment, the amount of waste material from a property repair is calculated from the amount of material required for the repair and the area of the building facets to be repaired. The volume, weight, and other measurements of the waste material can be used to determine the size of dumpsters required at the repair site. Each repair or replace item can be assigned a "haul away factor" which is used in determining waste disposal storage or recycling storage requirements. The amount of material (e.g., weight, number, etc.) can be multiplied or otherwise modified by the "haul away factor" to determine the storage requirements. Moreover, waste material measurements can be used to refine the property repair analysis. For example, if the area of waste material rises above a predetermined threshold (e.g., ten percent of the total building material used) the parameters (e.g., guidelines, digital inspection data, aerial CAD data, building material supplier information etc.) of the property repair analysis can be refined and the property repair analysis can be repeated.

In another embodiment, waste material can include recyclable material and the amount of recyclable material can be determined as part of determining repair waste 2550. In other embodiments determining recyclable material can be a separate step or can replace determining repair waste 2550. Jurisdictions can require that a predetermined amount of unused building material after a property repair be recyclable. For example, some jurisdictions can require that all of certain types of building material be 100% recyclable so that all of the waste can be recycled rather than be placed in a waste dumpster. Further, in some jurisdictions, predetermined amounts of particular types of building material must be recycled. For example, a jurisdiction may require that ten percent of all siding and roofing waste be recycled or that fifteen percent of all replaced or waste siding and roofing be recycled. One advantage of the present invention is the cost efficiency maximization not only of building materials order, delivered, and used, but of building materials wasted vs. recycled and of building material waste and recycling dumpster delivered and used. Dumpsters often must be rented and incur delivery and destination fees. Consequently, the accurate determination of the amount of building materials required for the repair, building material wasted, and building material recycled greatly reduces the overhead cost of dumpster use.

Determining repair waste 2550 can also include indicating any building materials required for the repair to be recycled. For example, contractors often do not understand which of the materials they use can be recycled. In some embodiments, contractors can be provided information about which of the building materials are recyclable along with how much they should anticipate to recycle. For example, a contractor, upon beginning a repair job, can be provided with an inventory of the building materials to be used, the amount of each building material required for the repair, an estimate of the amount of waste of each building material, which building material can be recycled, and any jurisdictional recycling requirements. As a result, the contractor can separate the recyclable building material waste from the non-recyclable at the job site. And because the number and size of dumpsters is minimized, the cost of disposing of building material waste also is minimized.

Figure 26:
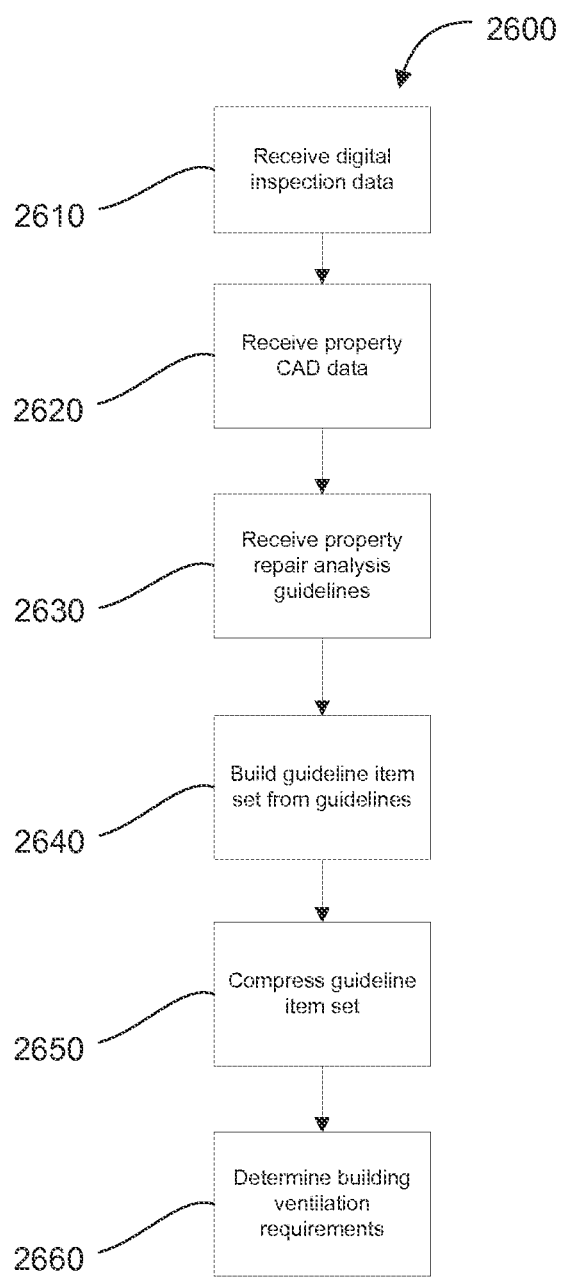
FIG. 26 shows a flowchart of a method for determining building ventilation repair requirements based on compressed guidelines in accordance with illustrative embodiments of the invention.

Referring now to FIG. 26, a method for determining roofing ventilation repair requirements 2600 is illustrated. Digital inspection data is received 2610. In one embodiment, an adjuster can gather information about a property for the repair analysis and transmit it, via property inspection device 170 to server 190. Digital inspection data can include onsite photos as described above, including photos of roof areas, roof vents, soffits, and other roofing properties relevant to an analysis of roof ventilation.

Property CAD data can be received 2620 and can be stored in memory 135 or storage device 130. Property CAD data can include aerial CAD data which provides roof dimensions. Property repair analysis guidelines can be received 2620 and a guideline item set can be built 2630 and compressed 2640 as described above in connection with FIGS. 23-25.

Building ventilation requirements can be determined 2650 from the digital inspection data, property CAD data, and guidelines. Current industry standards require that the amount of attic ventilation to be installed on a roof is based on a 1:150 to 1:600 ratio (in square inches) of attic ventilation to attic floor area. Each vent type has an opening area to allow air to move through. Each soffit vent at the roofs eave edge also has an opening for air to move through. According to industry standards, the quantity of openings that allow air to flow into the soffits, through the attic, and out the roof vents should be balanced. In one embodiment, as part of determining the building ventilation requirements 1350, the sufficiency of the current ventilation, based on current industry standards or future changes to standards, can be determined and additional ventilation can be recommended. This determination can be based on the digital inspection data and aerial CAD data. For example, dimensions of current ventilation, roofing, and soffits can be calculated from the digital inspection data. The calculation can be made by estimating the respective areas after processing one or more onsite photos or other digital inspection data and comparing them against aerial CAD of the roof from which the roofing area can be calculated and attic area can be determined or estimated.

Digital inspection data can also include heat measurements from the attic space. In the winter, heat radiates from the interior of the property through the attic and, in the summer, heat radiates from the sun through the roofing material into the attic. Onsite measurements of attic heat can be taken by an adjuster, for example, and transmitted from inspection device 170 or otherwise as described above. Ventilation ratios can be calculated based on the heat measurement. Furthermore, ventilation ratio can be determined from the attic volume gathered and transmitted which would indicate the amount of air that should be vented.

Some embodiments can include a waste container selection feature. During and after repair, waste and recyclable material must be disposed of and is typically disposed of in waste containers, either waste dumpsters, recycling dumpsters and the like. A contractor will often fail to order waste containers of an appropriate size, an appropriate number of waste containers, or both. Thus, there is a need to provide a waste container determination feature so that the appropriate waste containers are selected when determining an amount of waste material as part of a repair analysis. The system can include a waste container determination feature which can be done as an integral part of the repair analysis or as an optional part of the repair analysis. Additionally, a waste container determination feature can apply predetermined or user-selected settings to determine the appropriate waste containers.

In some instances, different waste container determination settings can be assigned to a contractor. FIG. 27 illustrates an exemplary user interface in accordance with embodiments for displaying and entering waste container settings based on a contractor. In some instances waste container determination can be done automatically for a contractor while in others waste container determination can be done in response to a user request ("Applies Dumpsters Auto" in FIG. 27). In some instances, a waste container determination can be made a selectable option or an unavailable option based on the contractor ("Allow Dumpster Application in UI" in FIG. 27). In some instances, this setting can be the basis for displaying a user interface option for calculating a waste amount, calculating waste container requirements, or both. FIG. 27 also includes an element for defaulting the user interface option for calculating a waste amount, calculating waste container requirements, or both to a particular value ("Default Dumpster Application in UI" in FIG. 27). Additionally, the settings can include a dumpster code ("Dumpster Code" in FIG. 27). The dumpster code can refer to a disposal grid that has a waste container order, waste container sizes, waste container weights, waste container volumes, and minimum thresholds for waste container. FIG. 28 illustrates an exemplary disposal grid user interface. The settings can further include a setting for using a default disposal grid or a predefined disposal grid based on the contractor ("Use Contractors Dumpsters" in FIG. 27). Each of the above waste container settings can be set to a default. It should be understood that these and other settings can be assigned to a contractor, a group of contractors (e.g., based on location of contractor, location of property, type of contractor, and the like), or across all contractors. Further, the waste container determination settings can be stored in a database in storage medium 130.

Returning to FIG. 28, a disposal grid user interface display of an embodiment is illustrated. A group of disposal containers, alternatively referred to as waste containers, can be configured and used by the contractors that follow a disposal methodology particular to the group of disposal containers. In some instances, as many disposal containers as needed can be added to the grid. In the example shown, each disposal container has container characteristics including a code, name, guide, maximum weight, maximum volume, evaluation order, estimating system code, minimum required weight, and quantity multiplier (some companies use fractional quantities). In some instances, disposal containers can include fewer container characteristics or additional characteristics. The disposal container characteristics can be stored in a database in storage medium 130. Additionally, the system can provide a user interface display so that that system can receive new disposal container characteristics.

Figure 29:
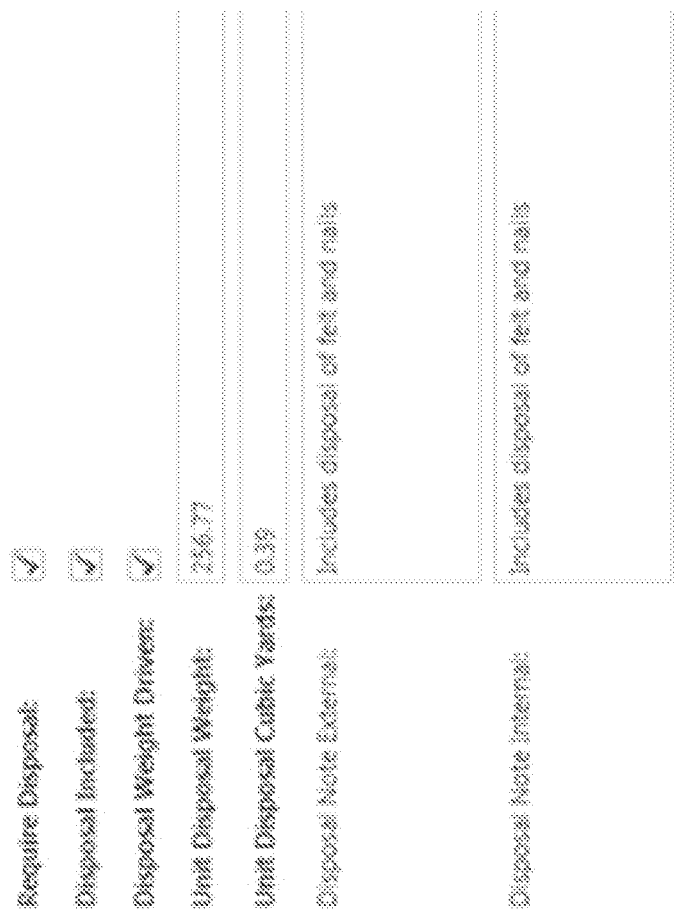

Referring now to FIG. 29, a user interface for configuring a scope item for disposal in accordance with embodiments. The Require Disposal user interface element can enable a user to indicate that a scope item does not require disposal. Some scope items do not require disposal because they are for putting items back on the house, not taking items off of the house. The Disposal Included interface element can enable a user to indicate that a scope item does not require disposal because disposal of the scope item is already determined. Some scope items do not require disposal because the estimating system already accounts for the disposal in the price of the scope item. The Disposal Weight Driven user interface item enables a user to indicate that the manner of disposal of a scope item should be determined by its weight. In some instances, heavier items should be placed in a disposal container first or before other items to maximize the use of the disposal container or for safety purposes. The Unit Disposal Weight user interface item enables a user to indicate the weight of a single unit of a scope item. In some instances, the unit disposal weight can be defined for each scope item in the system. The unit weight will be multiplied by the scope item's quantity to calculate the scope item's total weight. The Unit Disposal Cubic Yards user interface item enables a user to indicate the cubic yards for a scope item. The unit disposal cubic yards can be defined for each scope item in the system. The unit cubic yards will be multiplied by the scope item's quantity to calculate the scope item's total cubic yards.

Referring now to FIG. 30, a user interface display of scope items in accordance with embodiments is illustrated. Shown are individual scope items with their repair indicators, quantity, and measurement type ("Unit") for a particular repair analysis. Scope items are included for a roof and an elevation. It should be understood that the user interface display of FIG. 30 is exemplary and that other building facets and scope items could be included. A system estimated disposal is also included which can include waste container determination data, including the number and type of waste containers. FIG. 31 illustrates an exemplary user interface display of estimated debris removal and results of a waste container determination in accordance with embodiments. In some instances the number and type of waste containers is included and the amount (i.e., weight, volume, or both) of waste or recyclable material can be included.

Figure 32:
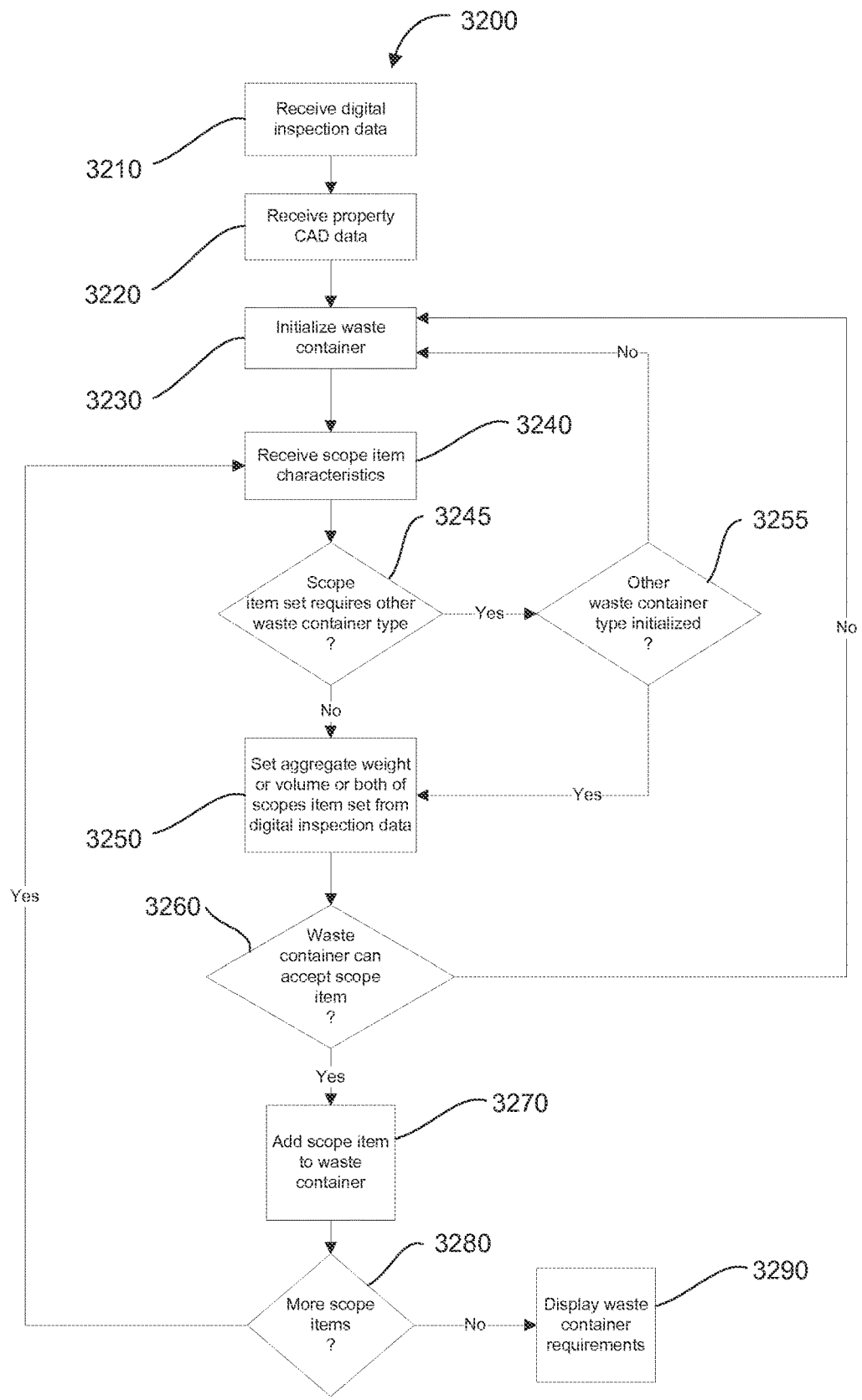
FIG. 32 shows a flowchart of a method for determining waste containers in accordance with illustrative embodiments of the invention.

Referring now to FIG. 32, a flowchart 3200 for determining waste container requirements in accordance with embodiments is shown. At step 3210, digital inspection data is received. At step 3220, property CAD data is received. At step 3230, a waste container is initialized. The waste container can be initialized to a default weight, default volume, or both. In some instances the defaults can be 0 or some predetermined value. For example, the default can be a default setting for the applicable contractor, property location, property type, some common waste container size, some combination thereof, or some other predetermined value set by a user. A waste container can be initialized from a set or list of available waste containers. A set of available waste containers can include a set similar to the disposal grid of FIG. 28.

At step 3240, scope item characteristics are received. Scope item characteristics can include data relating to the scope item including whether it is waste or recyclable material, the type of material, location on property of the scope item, weight, dimensions, volume, and the like. At step 3245, a determination is made whether the scope item requires a different waste container. For example, if the initialized waste container from step 3230 requires only disposable material but the scope item is recyclable, the determination can require that a different waste container is used. At step 3255, a determination is made whether the required waste container has been initialized and can be used for the scope item. If not, the appropriate waste container is initialized at step 3230 and the scope item characteristics are received again at step 3240.

At step 3250, the aggregate weight or volume or both of scope items is set from digital inspection data. It should be understood that other characteristics, such as dimension, can be aggregated. At step 3260, a determination is made whether the waste container can accept the scope items including the latest scope item according to the aggregate data. If the waste container cannot contain the scope item, another waste container is initialized. In some instances, another waste containers that has been initialized and are appropriate for the sceop item can be check for whether it can accept the scope item. At step 3270, the scope item is added to the waste container. At step 3280, a determination is made whether there are more scope items. If not, the waste container requirements for the repair analysis are displayed at step 3290.

In conclusion, the present invention provides, among other things, a system and method for intelligently setting building facet directionality and estimating a quantity of building material with waste associated with a building facet repair, replacement, or both. Additionally, it provides a system and method for using aerial CAD data, insurance and building code guidelines, weather data, and inspection data for intelligently making repair decisions for building facets. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:
  receiving a plurality of electronic CAD images of a first building, the plurality of electronic CAD images including at least one image of a first building facet;

determining an amount of building material required to repair damage to an area of the first building facet, including determining a first amount of waste building material associated with the first building facet;

projecting the plurality of electronic CAD images into a three-dimensional space; and presenting the three-dimensional electronic CAD images along with one or more repair indicators associated with the first building facet, wherein the three-dimensional electronic CAD images include images of at least one of ventilation, gutters, soffit, and siding trim, wherein the one or more repair indicators include an indication of the determined first amount of waste building material associated with the first building facet.

2. The method of claim 1, wherein the one or more repair indicators include an indication of an amount of material that is recyclable from the first amount of waste building material.

3. The method of claim 1, further comprising:
tagging, in the three-dimensional electronic CAD images, building facet lines with information describing building material to use in connection with repairing the damage to the area of the first building facet.

4. The method of claim 1, further comprising:
providing a replace or repair indicator adjacent to the first building facet in the three-dimensional electronic CAD images.

5. The method of claim 1, further comprising:
creating a three-dimensional model based on the three-dimensional electronic CAD images.

6. The method of claim 1, wherein the presentation of the three-dimensional electronic CAD images is generated with a combination of aerial CAD data and inspection data.

7. A method of property repair analysis, comprising:
receiving digital building data for a first building to be repaired;
receiving digital inspection data for the first building;
determining an amount of building material required to repair damage to an area of the first building, including determining a first amount of waste building material; and
presenting three-dimensional electronic CAD images of the first building, wherein the presentation of the three-dimensional electronic CAD images includes a presentation of one or more repair indicators associated with facets of the first building and a presentation of building materials to be used in connection with repairing the facets of the first building, and wherein the three-dimensional electronic CAD images are generated, at least in part, based on aerial CAD images of the first building, wherein the three-dimensional electronic CAD images include images of at least one of ventilation, gutters, soffit, and siding trim.

8. The method of claim 7, further comprising:
determining an amount of the building material that is recyclable;
determining an appropriate waste container size based upon the first amount of waste material less the amount of the building material that is recyclable; and
providing an indicator for the determined waste container size along with the presentation of the one or more repair indicators.

9. The method of claim 8, further comprising:
receiving a list of available waste containers;
wherein the appropriate waste container size is selected from the list of available waste containers.

10. The method of claim 9, further comprising:
determining an appropriate recycle container size based upon the amount of building material that is recyclable.

11. The method of claim 8, further comprising:
determining ventilation requirements associated with a first building facet; and
including the ventilation requirements in the determining of the first amount of waste building material and the amount of the building material that is recyclable.

12. The method of claim 7, wherein the presentation of the three-dimensional electronic CAD images is generated with a combination of aerial CAD data and inspection data.

13. The method of claim 7, further comprising:
tagging, in the presentation of the three-dimensional electronic CAD images, building facet lines with information describing building material to use in connection with repairing the damage to the area of an associated building facet.

14. A system comprising:
a processor; and
a computer-readable storage medium comprising computer-readable instructions which, when executed by the processor, cause the processor to:
receive a plurality of electronic CAD images of a first building, the plurality of electronic CAD images including at least one image of a first building facet;
determine an amount of building material required to repair damage to an area of the first building facet, including determining a first amount of waste building material associated with the first building facet;
project the plurality of electronic CAD images into a three-dimensional space; and
present the three-dimensional electronic CAD images along with one or more repair indicators associated with the first building facet, wherein the three-dimensional electronic CAD images include images of at least one of ventilation, gutters, soffit, and siding trim, wherein the one or more repair indicators include an indication of the determined first amount of waste building material associated with the first building facet.

15. The system of claim 14, wherein the one or more repair indicators include an indication of an amount of material that is recyclable from the first amount of waste building material.

16. The system of claim 14, wherein the instructions further cause the processor to tag, in the three-dimensional electronic CAD images, building facet lines with information describing building material to use in connection with repairing the damage to the area of the first building facet.

17. The system of claim 14, wherein the instructions further cause the processor to provide a replace or repair indicator adjacent to the first building facet in the three-dimensional electronic CAD images.

18. The system of claim 14, wherein the instructions further cause the processor to create a three-dimensional model based on the three-dimensional electronic CAD images.

19. The system of claim 14, wherein the presentation of the three-dimensional electronic CAD images is generated with a combination of aerial CAD data and inspection data.

20. The system of claim 14, wherein the instructions further cause the processor to determine an amount of the building material that is recyclable.

* * * * *